United States Patent [19]

Nagaoka et al.

[11] Patent Number: 4,825,367

[45] Date of Patent: Apr. 25, 1989

[54] CONTROL APPARATUS FOR CONTROLLING DEVICE LOADED ON VEHICLE

[75] Inventors: Mitsuru Nagaoka; Toshihiro Matsuoka, both of Hiroshima, Japan

[73] Assignee: Mazda Motor Corporation, Hiroshima, Japan

[21] Appl. No.: 136,997

[22] Filed: Dec. 23, 1987

[30] Foreign Application Priority Data

Dec. 23, 1986 [JP] Japan .................................. 61-305333
Dec. 23, 1986 [JP] Japan .................................. 61-305334
Dec. 23, 1986 [JP] Japan .................................. 61-305335

[51] Int. Cl.$^4$ .............................................. G06F 15/14
[52] U.S. Cl. ........................... 364/424.05; 364/424.01; 364/426.02; 364/426.03
[58] Field of Search ..................... 364/424, 424.1, 426, 364/427, 428, 431.01, 432, 433, 434, 436

[56] References Cited

U.S. PATENT DOCUMENTS

| | | | |
|---|---|---|---|
| 4,423,594 | 1/1984 | Ellis .......................... | 364/431.02 X |
| 4,499,543 | 2/1985 | Matsuda ..................... | 364/426 |
| 4,518,044 | 5/1985 | Wiegardt et al. ............ | 364/424 X |
| 4,551,801 | 11/1985 | Sokol ........................ | 364/424 |

Primary Examiner—Eugene R. LaRoche
Assistant Examiner—David Mis
Attorney, Agent, or Firm—Wegner & Bretschneider

[57] ABSTRACT

A control value of the control apparatus for controlling a device or devices loaded on a vehicle, for example, a slip ratio against a road surface of driven wheels for a slip control apparatus (traction control apparatus) is determined as a final control value based on plural input signals.

For every input signal, plural control zones coresponding to its signal value are present.

For every combination of the control zones, a basic control value is memorized in a memory; an adaptability for the control zone corresponding to each signal value is determined as a first adaptability; a second adaptability is determined on the basis of the first adaptability obtained for every input signal; and an inference control value is then determined on the basis of the second adaptability and the basic control value.

From the numbers of inference control values and second adaptabilities corresponding to the number of all combinations of the control zones, there is determined the final control value.

17 Claims, 18 Drawing Sheets

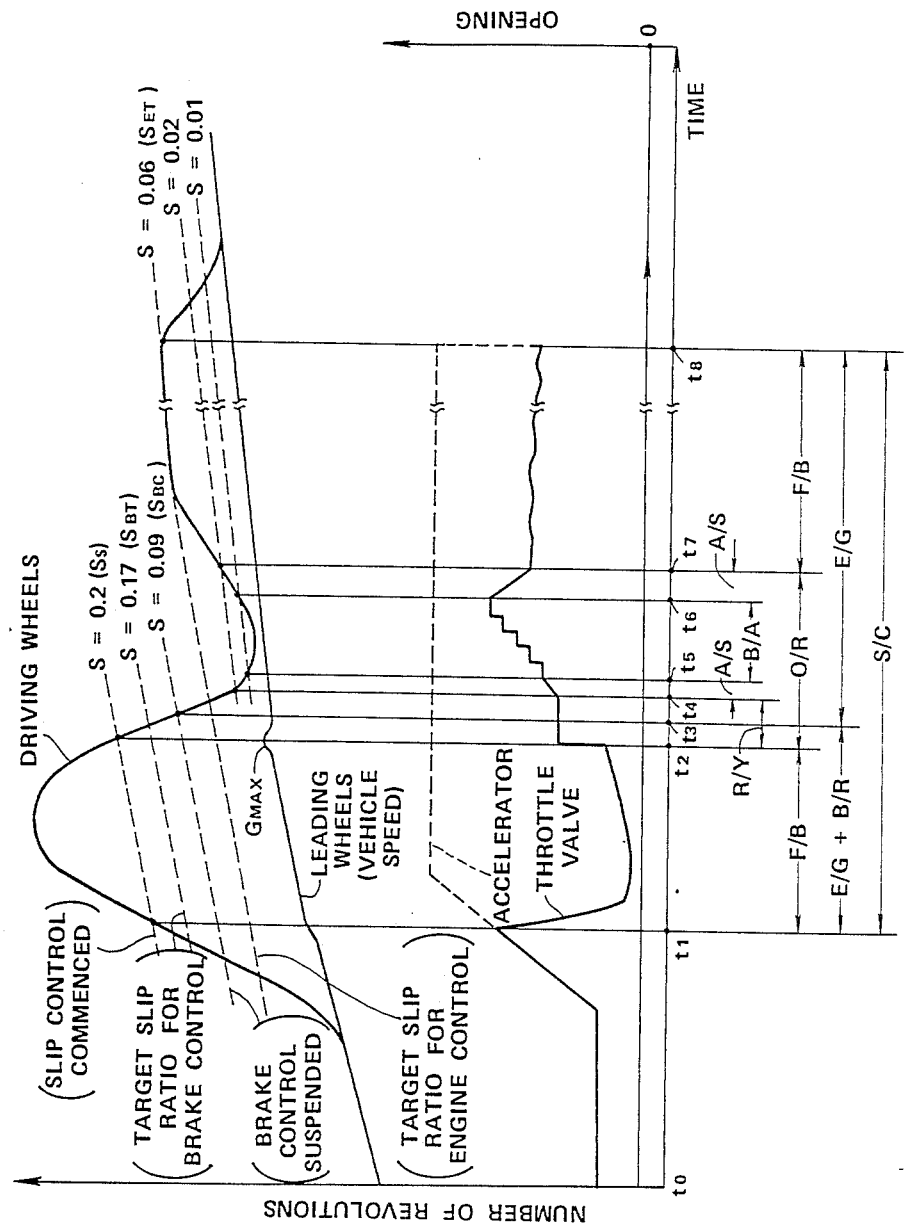

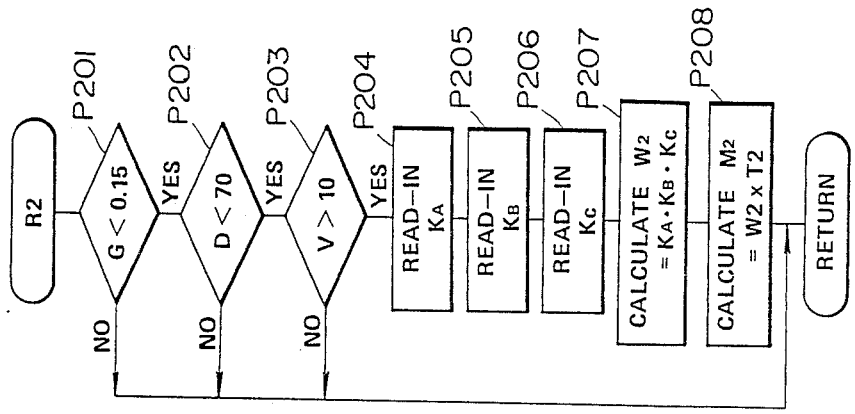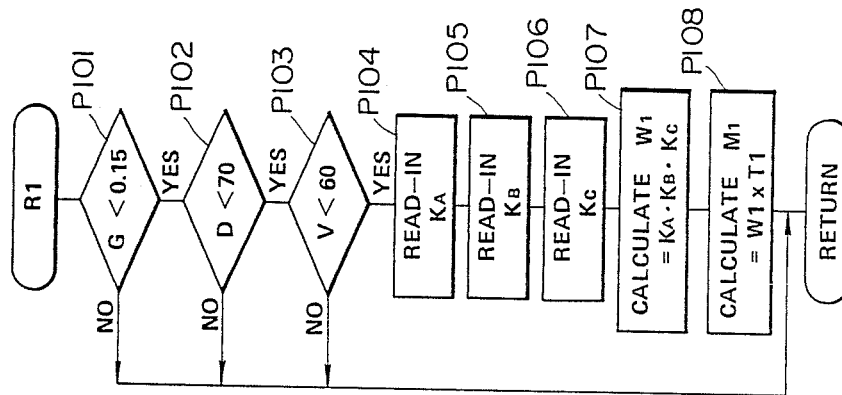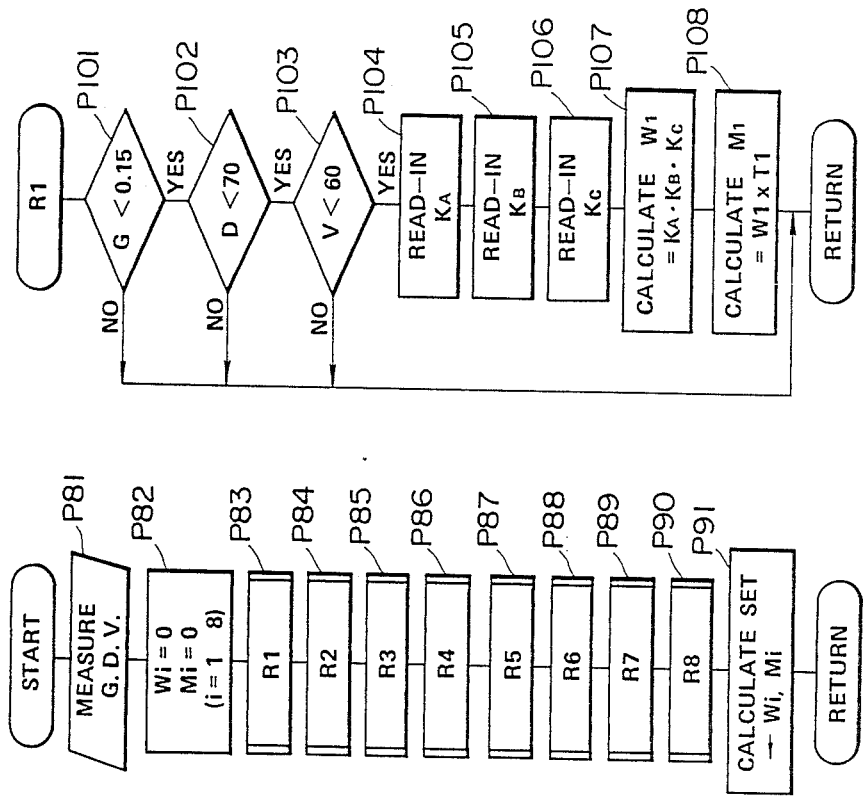

CONTROL APPARATUS FOR CONTROLLING DEVICE LOADED ON VEHICLE

FIELD OF THE INVENTION

The present invention relates to a control apparatus for controlling a device or devices loaded on a vehicle.

BACKGROUND OF THE INVENTION

Among device or apparatuses to be loaded on a vehicle, there are many that are controlled by a control value determined on the basis of plural input signals. Such devices and apparatuses may include a fuel injection system, a spark control device, a control apparatus for an automatic transmission, an attenuation control device for a suspension, an anti-brake lock device, a slip (traction) control apparatus, and an automatic drive apparatus. Recently, there is an increasing tendency that the number of sensors to be employed for control of the device or apparatus is increased, thus leading to an increase in the number of input signals, in order to control these devices and apparatuses in an optimum manner. As input signals may be used the number of engine revolutions, an engine load, a vehicle speed, an intake air amount, an intake air temperature, a battery voltage, an engine coolant temperature, an intake air density, a gear shift position, a slip state of a road surface, a loadage, an acceleration or deceleration speed, a road inclination, the number of wheel revolutions, a steered angle of a steering wheel, transverse G and so on. Such input signals as being of the manual type can also be used.

A conventional system for determination of a control value for a device to be loaded on a vehicle using plural input signals is disclosed in Japanese Patent Publication (laid-open) No. 159,928/1979 that is directed to a correction of a basic speed mode pattern of an automatic transmission on the basis of plural input signals. In determining a control value for this correction, the correction is made by adding plural correction coefficients obtained for signal values from the sensors. On top of that, a control value can also be obtained by multiplying correction coefficients obtained for input signal values by each other.

As the number of input signals as a basis for determining a control value increases, it becomes more difficult to give an optimum control value by way of addition or multiplication as have been used in conventional techniques. An increase in the number of the input signals increases conditions for combinations of the signal values in arithmetic progression. Accordingly, with conditions for all possible combinations taken into account, the formulation of each of the correction coefficients for all the combinations might destroy a whole balance if a correction characteristic for a certain signal value would be modified or might give an inappropriately final control value that could not be predicted in advance.

Furthermore, if an optimum control value could be obtained for all the possible combination conditions, a tremendous amount of laborious experiments should be repeated until such conditions have been set. In particular, work for confirmation and modification made by a great number of driving experiments should be so tremendously laborious because the optimum control value is required to be suited for the feeling or perception of an operator. In addition, characteristics for obtaining correction coefficients to be set for each of the input signals should be rendered so complex and delicate that a great burden may be given a control system in memorizing the characteristics.

SUMMARY OF THE INVENTION

The present invention has the object to provide a control apparatus for controlling a device loaded on a vehicle capable of giving an optimum control value in determining a control value for such an apparatus based on plural input signals in such a manner that labor required for experimets and so on to produce the optimum control value can be reduced to a considerably great extent and that a memory capacity of a control system can be minimized to a considerable level.

The present invention has another object to provide a control apparatus for controlling a device loaded on a vehicle suitable for determination of a control gain in the feedback control on the basis of plural input signals in the case of the control apparatus being an automatic drive apparatus that is designed to conduct the feedback control so as to cause an actual vehicle speed to become a target vehicle speed.

The present invention has a further object to provide a control apparatus for controlling a device loaded on a vehicle suitable for determination of a target slip ratio on the basis of plural input signals in the case of the control apparatus being a slip (traction) control appratus that is designed to cause a slip ratio of the driven wheel again a road surface to become a target slip ratio by adjusting a torque transmitted to the driven wheel.

In one aspect in order to achieve the above objects, the present invention comprises a control apparatus for controlling a device loaded on a vehicle in which a control value therefor is on the basis of plural input signals, said control apparatus comprising basic control value memorizing means for memorizing a basic control value obtained for every combination of plural control zones present for every signal value of said input signals; adaptability determining means for determining a second adaptability for every combination from a first adaptability obtained for every control zone with respect to every combination of said control zones; inference control value determining means for determining an inference control value for every combination from said basic control value and said second adaptability; and final control value determining means for determining a final control value from said second adaptability and said inference control values.

This construction of the control apparatus according to the present invention provides an optimum control value by giving a final control value with probability on the basis of a basic control value set for each of a combination of plural input signals with all possible combinations taken into account. This can prevent an inappropriate final control value from being chosen as a result of a unification of control values for all combinations. In particular, even if plural input signals would be a combination of any values, an adaptability for a predetermined control zone is inspected for each input signal value and furthermore such inspection is made for all combinations, whereby a selection of an inappropriate final control value can be prevented with certainty.

Although the basic control value is determined experimentally for each combination, it is not necessary to increase the number of control zones for one input signal, which determines the number of the combinations to a great extent. This may minimize labor required for experiment work and so on.

Furthermore, it is to be noted that setting plural control zones for one input signal results in minimizing the number of the control zones and eventually the number of the combinations, thus lessening a capacity of a memory means for the basic control values.

It is a matter of course that it is preferred to increase the number of the control zones to be set for one input signal. However, the number of the control zones can be determined on the basis of delicacy of a control required, a capacity of a memory means for memorizing the basic control values, and so on.

In the automatic drive apparatus, a control value determined by a means for determining the final control value is used as a control gain for the feedback control.

In the slip apparatus, a control value determined by a means for determining the final control value is used as a target slip ratio.

Other objects and advantages of the present invention will become apparatus from the course of the following description by way of embodiments.

BRIEF DESCRIPTION OF THE DRAWINGS

FIGS. 1 to 23 inclusive, shows an embodiment in which the control apparatus for controlling a device loaded on a vehicle is a slip control appartus, in which:

FIG. 1 is an overall schematic diagram;

FIG. 2 is a diagram illustrating a hydraulic brake control circuit;

FIG. 3 is a block diagram illustrating a feedback control of a throttle valve;

FIG. 4 is a block diagram illustrating a feedback control of a brake;

FIG. 5 is a diagrammatical graph illustrating a control example in accordance with the present invention;

FIGS. 6 to 11 are each a flowchart illustrating a control example in accordance with the present invention;

FIG. 12 is a graph illustrating the character of the throttle opening with respect to the accelerator opening when no slip control is conducted;

FIG. 13 is a graph showing the relationship of the grip force of the driven wheel with the transverse force thereof and the relationship of the slip ratios with road surface friction coefficients;

FIG. 14 is a graph showing correction values for correcting slip ratios at the commencement of the slip control in accordance with steered angles of a steering wheel;

FIG. 15 is a graph showing the optimum throttle opening corresponding to the maximum acceleration during the recovery control;

FIG. 16 is a graph showing the relationship of slip ratios for the absorb control with the throttle opening;

FIG. 17 is a table illustrating an example of a map for determining a target slip ratio;

FIGS. 18 to 20 are each a graph illustrating an adaptability vs. an input signal value for control zones;

FIGS. 21 to 23 are each a flowchart illustrating a control example in accordance with the present invention;

FIGS. 24 to 28 are each an example where the control apparatus is an automatic drive control apparatus, in which:

FIG. 24 is an overall schematic diagram;

FIG. 25 is a block diagram illustrating the case where the automatic drive control is made by way of the PID control; and FIGS. 26 to 28 are each a graph illustrating an adaptability for control zones with respect to signal values from a sensor.

DETAILED DESCRIPTION OF THE PREFERRED EMBODIMENTS

Brief Description on Overall Construction

Figure 1:
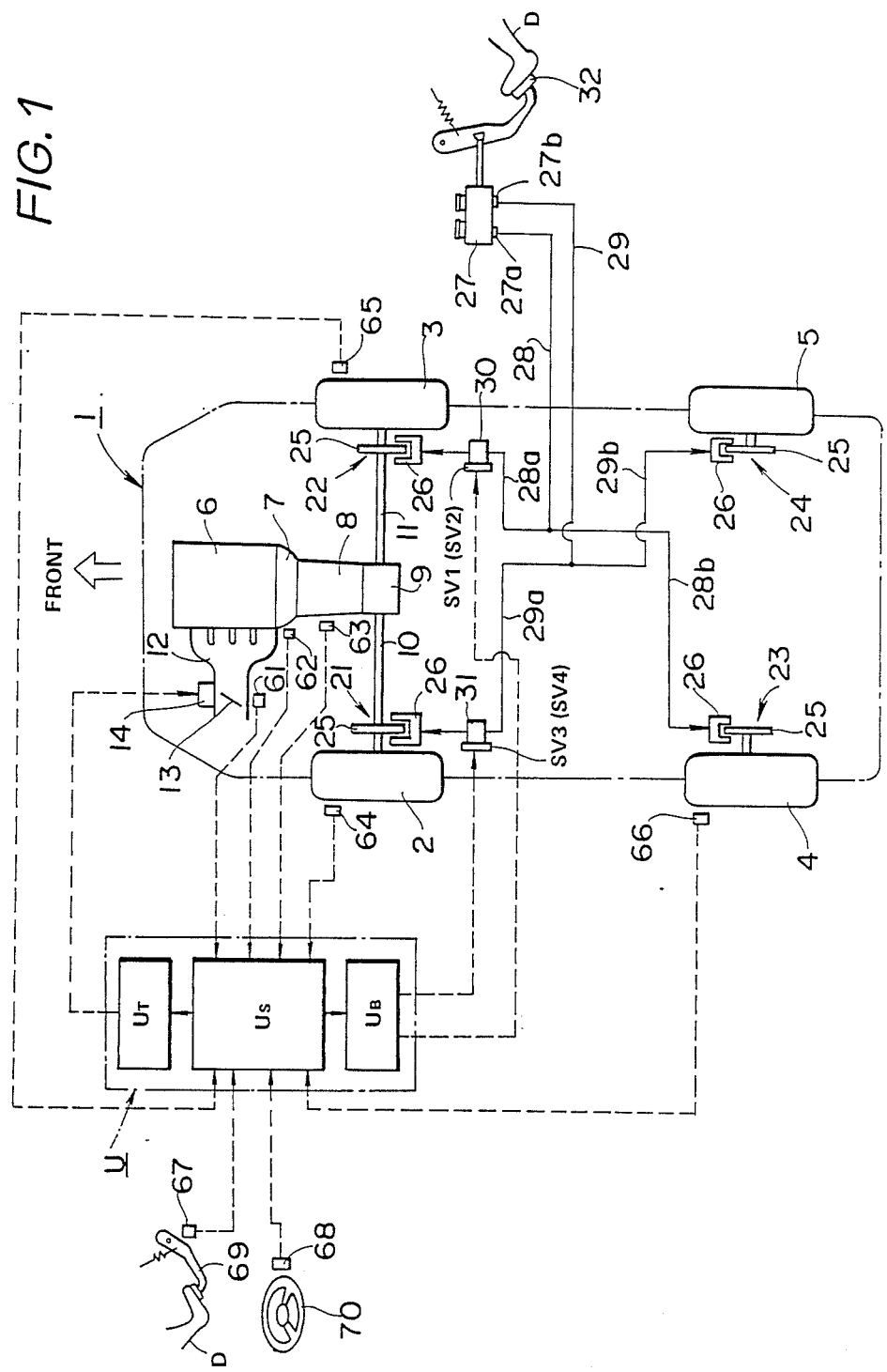

FIG. 1 shows a brief profile of the slip control apparatus. In this embodiment, a torque is transmitted to the driven wheels by adjusting the output torque of an engine and the braking force.

In FIG. 1, an automobile 1 contains a left front wheel 2 and a right front wheel 3, which function as driven (or driving) wheels, and a left rear wheel 4 and a right rear wheel 5, which function as undriven wheels. In the front of the automobile 1 is mounted an engine 6 as a power source, which generates a torque that is transmitted to a clutch 7, a transmission 8 and a differential gear 9 and then through a left drive shaft 10 and a right drive shaft 11 to the respective left and right front wheels 2 and 3 as the driven wheels. The automobile 1 used herein is of the FF (front-engine/front drive) type. The engine 6 used as the power source is shown to carry out the load control, that is, the control of the torque generated, by a throttle valve 13 mounted on an air intake passage 12. More specifically, the engine 6 is a gasoline engine of the type that the torque generated is varied with an amount of intake air. The control of the intake air amount may be conducted by the throttle valve 13, and the throttle valve 13 is electromagnetically opened or closed by a throttle actuator 14 that in turn may be composed of, for example, a DC motor, a stepping motor or any appropriate means that may be electromagnetically controlled by fluid pressures such as hydraulic pressures.

The wheels 2 to 5 are provided, respectively, with a brake 21, 22, 23 and 24, each of which may be a disk brake. The disk brake is provided with a disk 25 rotating with the respective wheels and a caliper 26. The caliper 26 holds a brake pad and is provided with a wheel cylinder, thus generating a braking force by pressing the brake pad on the disk 25 in accordance with a magnitude of the brake pressure to be supplied on the wheel cylinder.

A master cylinder 27 functioning as a source of generating the brake pressure may be of the tandem type having two discharging openings 27a and 27b. A braking pipe 28, on the one hand, extends from the discharging opening 27a and it is branched along the line into branch pipes 28a and 28b, the branch pipe 28a being connected to the brake 22, more specifically, to the wheel cylinder thereof, for the right front wheel and the branch pipe 28b being connected to the brake 23 for the left rear wheel. A braking pipe 29, on the other, extends from the discharging opening 27b and it is branched along the line into branch pipes 29a and 29b, the branch pipe 29a being connected to the brake 21 for the left front wheel and the branch pipe 29b being connected to the brake 24 for the right rear wheel. As described hereinabove, the braking pipe system may be of a so-called 2-system X type. To the branch pipes 28a and 29a for the respective brakes 21 and 22 of the front wheels functioning as the driven wheels are connected, respectively, hydraulic pressure control valves 30 and 31 of the electromagnetic type as means for controlling a braking force. It is noted as a matter of course that the brake pressure generating on the master cylinder 27 is of the type that varies with pressures generated by a brake pedal 32 to which the force stepped by an operator D is applied.

Brake Pressure Regulating Circuit

Figure 2:
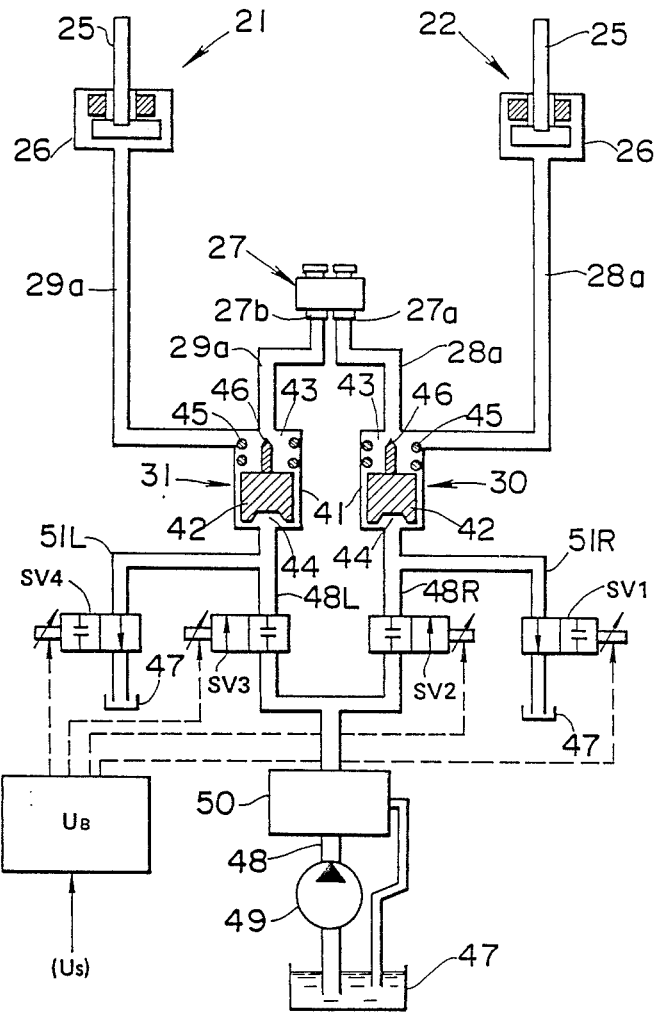

As shown specifically in FIG. 2, each of the control valves 30 and 31 are provided with a cylinder 41 and a piston 42 inserted slidably in the cylinder 41. The piston 42 divides the cylinder 41 into a volume-variable chamber 43 and a control chamber 44. The volume-variable chamber 43 works as a passage of the brake pressure against the brakes 21 and 22 from the master cylinder 27. Accordingly, the brake pressure is caused to generate against the brakes 21 and 22 as the volume of the volume-variable chamber 43 is varied in accordance with an adjustment of a displacement position of the piston 42 and the brake pressure generated is allowed to be increased, decreased or retained.

The piston 42 is always actuated by a return spring 45 in the direction so as to cause the volume in the volume-variable chamber 43 to be expanded. The piston 42 is integrated with a check valve 46. When the piston 42 is displaced in the direction to cause the volume in the volume-variable chamber 43 to be decreased, an inlet to the volume-variable chamber 43 is closed, whereby the brake pressure generated by the volume-variable chamber 43 works merely on the brake 21 and 22 and do not act on the brakes 23 and 24 for the rear wheels 4 and 5 functioning as the undriven wheels.

The displacement position of the piston 42 is adjusted by the hydraulic pressure against the control chamber 44. More specifically, a supply pipe 48 extending from a reservoir 47 is branched along the line into two branch pipes 48R and 48L, one branch pipe 48R being connected to the control chamber 44 of the valve 30 and the other branch pipe 48L being connected to the control chamber 44 of the valve 31. To the supply pipe 48 are connected a pump 49 and a relief valve 50. To the branch pipes 48R and 48L are connected, respectively, supply valves SV2 and SV3 consisting each of an electromagnetically switching (open-close) valve. Each of the control valves 44 is connected to the reservoir 47 through discharge pipes 51R and 51L, the discharge pipe 51R being connected with a discharge valve SV1 consisting of an electromagnetically switching valve and the discharge pipe 51l being connected with a discharge valve SV4 consisting of an electromagnetically switching valve.

When the braking is effected using each of the hydraulic pressure regulating valves 30 and 31, that is, when the slip control is conducted, a brake does not effectively work basically by way of operation of the brake pedal 32 due to an action of the check valve 46. When the brake pressure to be generated by the hydraulic pressure regulating valve 40 or 31 is small, for example, when the pressure is decreased, the brake works by way of operation of the brake pedal 32. Of course, when no brake pressure for the slip control is generated by the hydraulic pressure regulating valve 30 or 31, a usual braking action arising from operation of the brake pedal 32 works because the master cylinder 27 is caused to communicate with the brake 21 or 22.

Each of the valves SV1 to SV4, inclusive, is controlled by opening or closing by way of a brake control unit $U_B$ as will be described more in detail below. A table below demonstrates relationships of a state of the brake pressure against the brakes 21 and 22 with operation of each of the valves SV1 to SV4, inclusive.

|  | VALVES | | | |
| --- | --- | --- | --- | --- |
|  | SV 1 | SV 2 | SV 3 | SV 4 |
| BRAKE 21 | | | | |
| Increase Pressure | — | — | Opened | Closed |
| Decrease Pressure | — | — | Closed | Opened |
| Retain Pressure | — | — | Closed | Closed |
| BRAKE 22 | | | | |
| Increase Pressure | Closed | Opened | — | — |
| Decrease Pressure | Opened | Closed | — | — |
| Retain Pressure | Closed | Closed | — | — |

Brief Construction of Control Units

Referring to FIG. 1, reference symbol U denotes generally a control unit group consisting roughly of a brake control unit $U_B$, a throttle control unit $U_T$ and a slip control unit $U_S$. The brake control unit $U_B$ is designed so as to control the opening or closing of each of the valves SV1 to SV4, inclusive, as have been described above, on the basis of signals output from the slip control unit $U_S$. The throttle control unit $U_T$ is to control the operation of the throttle actuator 14 on the basis of signals output from the slip control unit $U_S$.

The slip control unit $U_S$ comprises a computer of the degital type, more specifically, a microcomputer. The slip control unit $U_S$ is given signals output from each of sensors or switches 61 to 68, inclusive. The sensor 61 is to detect a degree of the opening of the throttle valve 13. The sensor 62 is to detect whether or not the clutch 7 is jointed. The sensor 63 is to detect the number of speeds of the transmission 8. The sensors 64 and 65 are, respectively, to detect the numbers of revolutions of the lefthand and righthand front wheels 2 and 3 as the driven wheels. The sensor 66 is to detect the number of revolutions of the rear wheel 4 as the underiven wheel, that is, a vehicle speed. The sensor 67 is to detect an amount of operation of an accelerator 69, that is, an opening of the accelerator. The sensor 68 is to detect an amount of operation of a steering wheel 70, that is, a steered angle. Each of the sensors 64, 65 and 66 is composed using, for example, a pick-up, and each of the sensors 61, 63, 67 and 68 is composed using, for example, a potentiometer. The sensor 62 comprises, for example, an on/off switch.

The slip control unit $U_S$ is provided basically with a CPU, a ROM, a RAM, a CLOCK and an output/input interface as well as an A/D converter or a D/A converter in accordance with input signals or output signals. This is the same when a microcomputer is employed so that detailed description thereon will be omitted herein. A description on maps, however, will be made herein by referring to those memorized in the ROm of the control unit $U_S$.

The following is a description on the control procedures of the control unit group U. A slip ratio S used therefor may be defined by the following relationship (1):

$$S = \frac{W_D - W_L}{W_D} \qquad (1)$$

where $W_D$ is the number of revolutions of the driven wheels (2 and 3) and $W_L$ is the number of revolutions of the undriven wheel (4), that is, the vehicle speed.

Throttle Control

Figure 12:
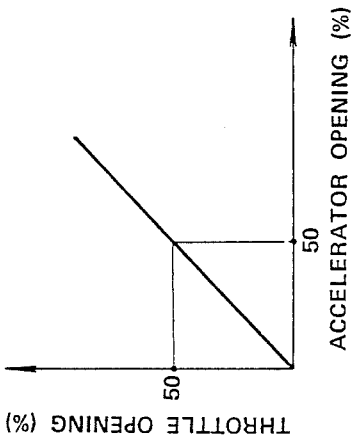

The throttle control unit $U_T$ is designed to conduct the feedback control of the throttle valve 13 (or the throttle actuator 14) so as to become a target throttle opening. When no slip control is conducted during the throttle control, the target throttle opening is regulated so as to be proportional by a 1-to-1 ratio to the amount of operation of the accelerator 69 by an operator D. FIG. 12 shows one example of the relationship of the throttle opening with the accelerator opening. The throttle control unit $U_T$ is also designed to carry out the throttle control to become a target throttle opening Tn integrated by the slip control unit $U_S$, upon the slip control, without following the characteristic demonstrated in FIG. 12.

The feedback control of the throttle valve 13 using the throttle control unit $U_T$ is designed in this embodiment to be carried out by way of the PI-PD control so as to compensate for a variation in a response speed of the engine 6. That is, the opening of the throttle valve 13 is regulated by way of the PI-PD control so as to coincide the present slip ratio with the target slip ratio during the slip control of the driven weels. More specifically, the target throttle opening Tn during the slip control can be given by the following relationship (2):

$$T_n = T_{n-1} + K_I \times \left( \frac{W_{Ln}}{1 - S_{ET}} - W_{Dn} \right) +$$

$$K_P \times \left( \frac{W_{Ln} - W_{Ln-1}}{1 - S_{ET}} - W_{Dn} + W_{Dn-1} \right) -$$

$$F_P(W_{Dn} - W_{Dn-1}) - F_D(W_{Dn-2} \times W_{Dn-1} + W_{Dn-2}) \quad (2)$$

where $W_L$ is the number of revolutions of the undriven wheel (4);

$W_D$ is the number of revolutions of the driven wheels (2 and 3);

$K_P$ is a proportional coefficient;

$K_I$ is an integral coefficient;

$F_P$ is a proportional coefficient;

$F_D$ is a differential coefficient; and $S_{ET}$ is a target slip ratio for the throttle control.

As given by the above relationship (2), the numbers of revolutions of the driven wheels are regulated by way of the feedback control so as to cause the throttle opening Tn to become a predetermined target slip ratio $S_{ET}$. In other words, as is apparent from the above relationship (1), the throttle opening is regulated so as for the target revolution numbers of the driven wheels, $W_{ET}$, to have the following relationship (3):

$$W_{ET} = \frac{W_L}{1 - S_{ET}} \quad (3)$$

Figure 3:
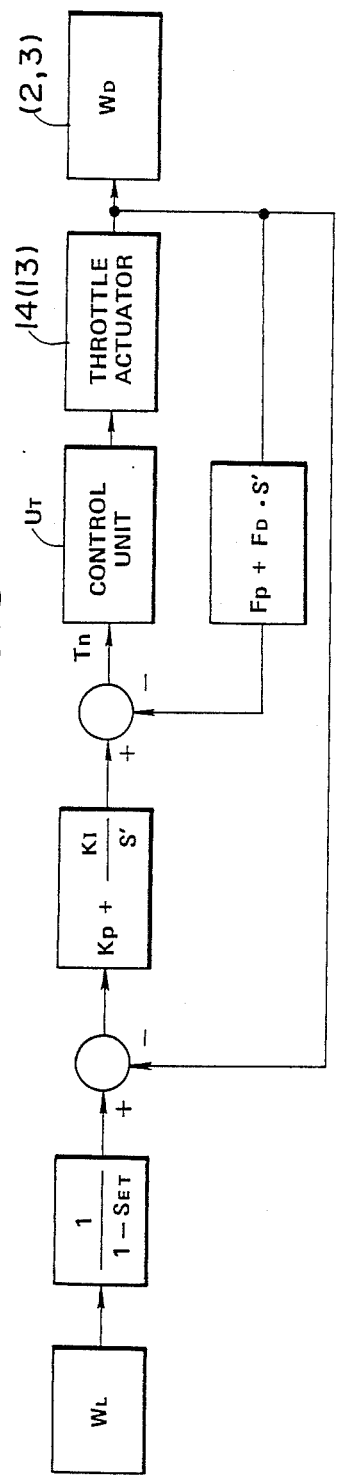

FIG. 3 shows the PI-PD control using the throttle control unit $U_T$ as a block diagram, in which reference symbol "S" denotes an operator and suffixes "n" and "n−1" denote, respectively, values of signals at the present sampling time and at the sampling time by one previous to the present sampling time.

Brake Control

At the time of the slip control, the feedback control is effected using the brake control unit $U_B$ such that the spinning of the left and right driven wheels 2 and 3, respectively, is caused to become a predetermined target slip ratio $S_{BT}$ independently and separately from each other. In other words, the brake control is conducted by way of the feedback control such that the numbers of revolutions of the driven wheels, $W_{BT}$, is determined by the following relationship (4):

$$W_{BT} = \frac{W_L}{1 - S_{BT}} \quad (4)$$

In this embodiment, the target slip ratio $S_{BT}$ by the brake is determined to a degree larger than the target slip ratio $S_{ET}$, as will be described below. In other words, the slip control in this embodiment is conducted so as to lessen a frequency of the use of the brake by increasing or decreasing the engine output to become the predetermined target slip ratio $S_{ET}$ for the throttle control or the predetermined target slip ratio $W_{ET}$ and, further, by increasing or decreasing the torque by the brake to cause the target slip ratio $S_{ET}$ or the target slip ratio $W_{ET}$ to become larger than the target brake slip ratio $S_{BT}$ or the number of revolutions of the driven wheels $W_{BT}$. Further, in this embodiment, the feedback control is carried out by the I-PD control so as to satisfy the relationship (4). This is superior in stability. More specifically, an amount of the brake operation (an amount of operation of the pistons 44 in the valves 30 and 31) Bn can be given by the following relationship (5):

$$B_n = B_{n-1} + K_I \left( W_{Ln} \times \frac{1}{1 - S_{BT}} - W_{Dn} \right) - \quad (5)$$

$$F_P(W_{Dn} - W_{Dn-1}) - F_D(W_{Dn} - 2 \times W_{Dn-1} + W_{Dn-2})$$

where $K_1$ is an integral coefficient, $K_D$ is a proportional coefficient, and $F_D$ is a differential coefficient.

When the amount of the brake operation Bn is larger than zero, that is, when it is positive, the brake pressure is decreased. When the amount of the brake operation Bn is equal to or smaller than zero, that is, when it is negative, the brake pressure is increased. An increase or decrease in the brake pressure is conducted by opening or closing the valves SV1 to SV4, inclusive, as have been described above. A speed of the increase or decrease in the brake pressure is adjusted by ratios of the opening time to the closing time (duty ratios) of the valves SV1 to SV4, inclusive, by way of the duty control that is proportional to the absolute value of the brake operation amount Bn given by the relationship (5) above. Accordingly, the absolute valve of the brake operation amount Bn becomes proportional to a speed of a variation in the brake pressures, and the duty ratio determining the speed of the increase or decrease in the brake pressures indicates the brake operation amount Bn.

Figure 4:
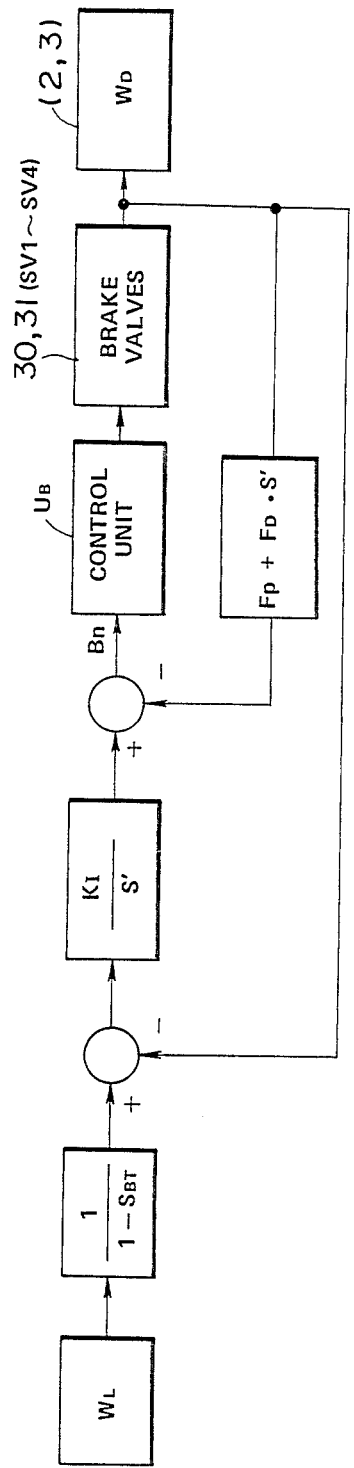

FIG. 4 indicates the I-PD control using the brake control unit $U_B$, as have been described above, as a block diagram, in which reference symbol "S'" denotes an operator.

Determination of Target Slip Ratio $S_{ET}$ for Engine

The following description is on the way of determining the target slip ratio $S_{ET}$ for the engine based on plural input signals. In this embodiment, a vehicle body acceleration G, a steered angle D of a steering wheel, and a vehicle speed V are used as such input signals.

Figure 18:
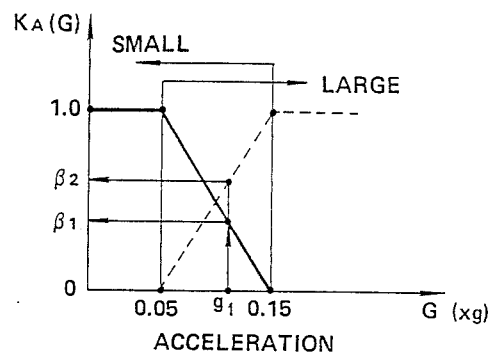
Figure 19:
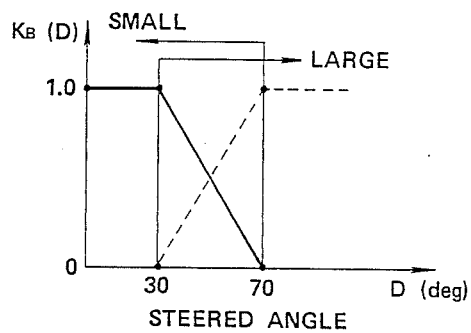
Figure 20:
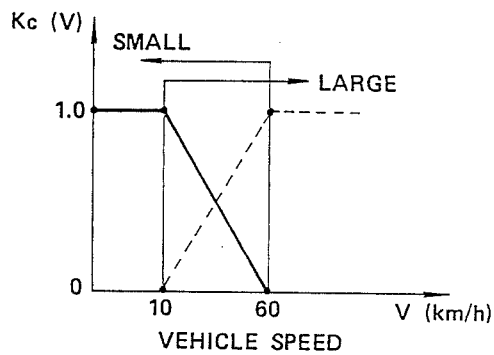

Referring first to FIGS. 18 to 20, inclusive, it is described on how to set control zones and degrees of adaptability. In this embodiment, two control zones are set for each of input signals G, D and V, one zone being for an input signal value larger than a predetermined reference value and the other being for an input signal value smaller than another predetermined reference value. As shown in FIG. 18, where a value of the signal for the vehicle body acceleration G is larger than 0.05 G, the control zone therefor is set as a zone, referred to as a "larger" control zone, as in the righthand area from the broken line in FIG. 18. Where the signal value G is smaller than 0.15 G, a smaller control zone is set (as in the lefthand area from the solid line in FIG. 18). For the steered angle D of the steering wheel, likewise, where the signal value D is larger than 30 deg, on the one hand, a larger control zone is set (as in the righthand area from the broken line in FIG. 19) and, where it is smaller than 70 deg, on the other hand, a smaller control zone is set (as in the lefthand area from the solid line in FIG. 19). For the vehicle speed V, where the signal value V is larger than 10 km/h, on the one hand, a larger control zone is set (as in the righthand area from the broken line in FIG. 20) and, where it is smaller than 60 km/h, on the other, a smaller control zone is set (as in the lefthand area from the solid line in FIG. 20).

FIGS. 18 to 20 indicate each a map in which a degree of adaptability $K_A$, $K_B$ or $K_C$ is set with respect to the larger control zone and the smaller control zone for each of the signal values G, D or V, respectively. It is noted herein that the two control zones, viz., the smaller and larger control zones, have a portion where the signal value overlaps with each other. Each of the portions ($0.05 \leq G \leq 0.15$; $30 \leq D \leq 70$ and $10 \leq V \leq 60$) is a boundary zone between the two control zones and is designed to allow adaptability $K_A$, $K_B$ and $K_C$, respectively, to shift from 0 to 1.0 (from 0% to 100%). For instance, if a signal value G is g1 between 0.05 and 0.15 in FIG. 18, the adaptability for the smaller control zone is $\beta1$ with respect to the solid line in FIG. 18 and the adaptability for the larger control zone therein is $\beta2$ with respect to the broken line in FIG. 18. It is noted that, when the signal value G is smaller 0.05, the adaptability for the smaller control zone is 1.0 (100%), on the one hand, and the adaptability for the larger control zone is 0 (0%), on the other hand. It is further noted that, when it is larger than 0.15, the adaptability for the larger control zone is 1.0 (100%), on the one hand, and the adaptability for the smaller control zone is 0 (0%), on the other. The same things can be said of the signal value D and the signal value V.

As the two control zones, smaller and larger, are set for each of the signal values G, D and V, a total number of 8 combinations is given. Table 2 shows the full relationships between the adaptabilities for the smaller and larger control zones for the signal values G, D and V.

TABLE 2

| RULES | SIGNAL VALUES | | | BASIC VALUES | ADAPT-ABILITY | INFERENCE VALUE |
|---|---|---|---|---|---|---|
| | G | D | V | Ti | Wi | Mi |
| R1 | S | S | S | T1 = 0.15 | W1 | M1 |
| R2 | S | S | L | T2 = 0.10 | W2 | M2 |
| R3 | S | L | S | T3 = 0.02 | W3 | M3 |
| R4 | S | L | L | T4 = 0.01 | W4 | M4 |
| R5 | L | S | S | T5 = 0.20 | W5 | M5 |
| R6 | L | S | L | T6 = 0.15 | W6 | M6 |
| R7 | L | L | S | T7 = 0.05 | W7 | M7 |
| R8 | L | L | L | T8 = 0.02 | W8 | M8 |

Notes:
S = Smaller control zone; L = Larger control zone
$W_i = K_A \times K_B \times K_C$
$M_i = T_i \times W_i$ The basic target value Ti (where i = 1, 2, 3, 4, 5, 6, 7, and 8) is experimentally decided for each of the rules R1 to R8, inclusive. For instance, for rule R1 where the signal values G, D and V are all set in the smaller control zone, the optimum basic target value T1 is experimentally set to be 0.15. For rule R7 where the signal values G and D are set in the larger control zone and the signal value V is in the smaller control zone, the optimum basic target value T7 is experimentally set to be 0.05. In conducting such experiments as for determining the basic target values, there is employed an input signal value that allows the adaptability for the smaller or larger control zone to become 1.0. For example, the signal value G for determining the basic target value T1 = 0.05 in rule R1 is set smaller than 0.05 in order for the adaptability for the smaller control zone to become 1.0.

The final target value will be obtained according to the following steps and the steps will be described below with reference in Table 2 above and FIGS. 18 to 20.

(1) For rule R1, the adaptabilities $K_A$, $K_B$ and $K_C$ with respect to the control zone for each of the signal values G, D and V. The adaptability $K_A$ is given with reference to FIG. 18 as an adaptability for the smaller control zone for the signal value G because the control zone in rule R1 is set as the smaller control zone therefor. Likewise, the adaptability $K_B$ is given with reference to FIG. 19 as an adaptability for the smaller control zone for the signal value D because the control zone in rule R1 is set as the smaller control zone therefor. Furthermore, the adaptaptability $K_C$ is likewise given with reference to FIG. 20 as an adaptability for the smaller control zone for the signal value V because the control zone in rule R1 is set as the smaller control zone therefor.

(2) Then the overall adaptability W1 for the rule R1 is given by multiplying all the adaptabilities $K_A$, $K_B$ and $K_C$ obtained in the step (1) above.

(3) The inference target value M1 is then given by multiplying the adaptability W1 obtained in the step (2) with the basic target value T1.

(4) By following the above procedures, the adaptabilities W2 to W8 and the inference target values M2 to M8, inclusive, are given.

(5) The final control values for the rules R1 to R8 are then given from the following relationship (6):

$$S_{ET} = \frac{\sum_{i=1}^{8} Mi}{\sum_{i=1}^{8} Wi} \qquad (6)$$

It is possible to first vive the adaptabilities $K_A$, $K_B$ and $K_C$ for the respective signal values G, D and V in each of the rules R1 to R8 and then determine the adaptabilities W1 to W8 and the inference target values M1 to M8. In this case, a total number of 24 values for the adaptabilities ($K_A$, $K_B$ and $K_C$) should be memorized. Accordingly, it is preferred to use the steps (1) to (5) referred to hereinabove from the point of view of reducing a memory capacity.

Determination of Target Slip Ratios $S_{ET}$ For engine (Flow Charts)

The way of control for operation of the steps (1) to (5) described above will be described with reference to flow charts shown in FIGS. 21 to 23. In the following description and the flow charts, reference symbol "P" means a step.

In FIG. 21, each of the siganl values G, D and V is measured at P81 and each of the adaptability Wi (where i is 1 to 8, inclusive) and the inference target value Mi (where i is 1 to 8, inclusive) is initialized to 0 at P82.

In P83 to P90, the adaptabilities W1 to W8 and the inference target values M1 to M8 for the respective rules R1 to R8 are calculated. Then in P91, the target slip ratio $S_{ET}$ for the engine as a final target value is calculated.

More specifically, details of P83 will be described with reference to the flow chart shown in FIG. 22. In P101 to P103, it is discriminated whether or not the respective signal value G, D and V are in the smaller control zone. If YES at all the steps P101 to P103, the adaptabilities $K_A$, $K_B$ and $K_C$ are read in with reference to maps as shown in FIGS. 18 to 20, respectively, at P104 to P106. Then the adaptability W1 is calculated at P107 and the coresponding inference value M1 is calculated at P108.

If NO at either of P101 to P103, the flow advances to P84 in FIG. 20. In this case, the adaptability W1 and the inference value M1 are both initialized to 0 at P82.

FIG. 23 shows details of P84 and they are substantially the same as P83 for the rule R1 as shown in FIG. 22. It is noted that the rule R1 shows in FIG. 22 is different from the rule R2 shown in FIG. 23 merely in the discrimination of the signal values G, D and V at P201 to P203, respectively. THe same thing can be said of the other steps P85 to P90 for the respective rules R3 to R8 so that descriptions thereon will be omitted herefrom for brevity of explanation.

One example of determining a target slip ratio $S_{ET}$ for the engine will be described below with reference to figures. For instance, when the signal values G, D and V are 0.1, 30 and 60, respectively, the adaptability Wi ($K_A \times K_B \times K_C$) and the inference target value Mi (Ti×Wi) for each of the rules R1 to R8 will be given as follows:

Rule R1:
  W1=0 (0.5×1.0×0)
  M1=0 (0.15×0)
Rule R2:
  W2=0.5 (0.5×1.0×1.0)
  M2=0.05 (0.10×0.5)
Rule R3:
  W3=0 (0.5×0×0)
  M3=0 (0.02×0)
Rule R4:
  W4=0 (0.5×0×1.0)
  M4=0 (0.01×0)
Rule R5:
  W5=0 (0.5×1.0×0)
  M5=0 (0.20×0)
Rule R6:
  W6=0.5 (0.5×1.0×1.0)
  M6=0.075 (0.15×0.5)
Rule R7:
  W7=0 (0.5×0×0)
  M7=0 (0.5×0)
Rule R8:
  W8=0 (0.5×0×1.0)
  M7=0 (0.02×0)

From the above values W1 to W8 and M1 to M8, the formula (6) gives $S_{ET}$=0.125 as a final target value. This value is determined to be chosen as a value between the rules R2 and R6 from the inference computation.

Determination of Target Slip Ratio $S_{BT}$ For Brake

The target slip ratio $S_{BT}$ may also be determined on the basis of the acceleration G, the steered angle D and the vehicle speed V in the same manner as the target slip ratio $S_{ET}$ for the engine. The adaptability with respect to the control zones of the signal values G, D and V for the determination of the target slip ratio $S_{BT}$ is given with reference to FIGS. 18 to 20. It is provided in this respect, however, that a basic value Ti for the target slip ratio $S_{BT}$ for the brake is set on the basis of Table 3 below as is different from the target slip ratio $S_{ET}$ for the engine.

TABLE 3

| RULES | SIGNAL VALUES | | | BASIC VALUES | ADAPT-ABILITY | INFERENCE VALUE |
|---|---|---|---|---|---|---|
| | G | D | V | Ti | Wi | Mi |
| R1 | S | S | S | T1 = 0.20 | W1 | M1 |
| R2 | S | S | L | T2 = 0.15 | W2 | M2 |
| R3 | S | L | S | T3 = 0.03 | W3 | M3 |
| R4 | S | L | L | T4 = 0.15 | W4 | M4 |
| R5 | L | S | S | T5 = 0.30 | W5 | M5 |
| R6 | L | S | L | T6 = 0.20 | W6 | M6 |
| R7 | L | L | S | T7 = 0.08 | W7 | M7 |
| R8 | L | L | L | T8 = 0.03 | W8 | M8 |

Notes:
S = Smaller control zone; L = Larger control zone
Wi = $K_A \times K_B \times K_C$
Mi = Ti × Wi The target slip ratio $S_{BT}$ for the brake is also determined in substantially the same manner as the target slip ratio $S_{ET}$ for the engine. For example, by taking as an example when the acceleration G, the steered angle D of a steering wheel, and the vehicle speed V are 0.1, 30, and 60, respectively, the way of determining the target slip ratio $S_{BT}$ for the brake will be described as well as an description on the other will be omitted herefrom for brevity of explanation. An illustration of flow charts is also omitted and it is to be noted, however, that FIGS. 21 to 23 can be used for description on the way of determination of the target slip ratio $S_{BT}$ for the brake merely by rephrasing the term "CALCULATE $S_{ET}$" to the term "CALCULATE $S_{BT}$", for example, in FIG. a 21.

In this case, the target slip ratio $S_{BT}$ for the brake is determined as follows:

Rule R1:
   W1=0 (0.5×1.0×0)
   M1=0 (0.20×0)
Rule R2:
   W2=0.5 (0.5×1.0×1.0)
   M2=0.075 (0.15×0.5)
Rule R3:
   W3=0 (0.5×0×0)
   M3=0 (0.03×0)
Rule R4:
   W4=0 (0.5×0×1.0)
   M4=0 (0.015×0)
Rule R5:
   W5=0 (0.5×1.0×0)
   M5=0 (0.30×0)
Rule R6:
   W6=0.5 (0.5×1.0×1.0)
   M6=0.1 (0.2×0.5)
Rule R7:
   W7=0 (0.5×0×0)
   M7=0 (0.08×0)
Rule R8:
   W8=0 (0.5×0×1.0)
   M7=0 (0.3×0)

From the above values W1 to W8 and M1 to M8, the following formula (7) gives $S_{ET}=0.175$ as a final target value.

$$S_{BT} = \frac{\sum_{i=1}^{8} Mi}{\sum_{i=1}^{8} Wi} \quad (7)$$

Brief Description on Overall Slip Control system

An overall system of the slip control will be described herein with reference to FIG. 5. In this embodiment, when a slip of the driven wheels is large, on the one hand, the slip control is conducted by way of both the output torque of the engine being reduced and the braking force being transmitted by the brake. When a slip of the driven wheels is small, on the other hand, the slip control is conducted by way of adjustment of the output torque of the engine alone. Accordingly, the target slip ratio $S_{ET}$ for the engine is set smaller than the target slip ratio $S_{BT}$ for the brake, and the slip ratio $S_{BC}$ for suspending the brake control in order to thoroughly suspend the slip control by the brake is set as a value slightly larger than the target slip ratio $S_{ET}$.

Figure 13:
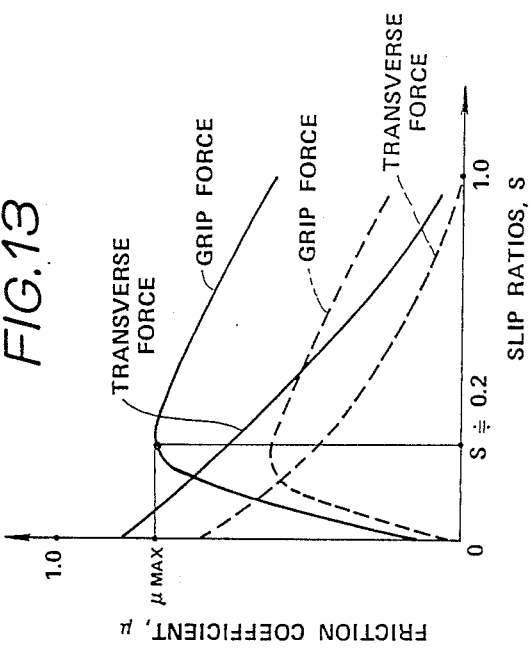

In FIG. 5, where reference symbols and figures have the following meanings:
   S/C: region of the slip control;
   E/G: slip control by the engine;
   B/R: slip control by the brake;
   F/B: feedback control
   O/R: open loop control
   R/Y: recovery control
   B/A: backup control
   A/S: absorb (shockless) control
   $S=0.2$: slip ratio at the time of commencement of the slip control ($S_s$)
   $S=0.17$: target slip ratio by the brake ($S_{BT}$)
   $S=0.09$: slip ratio at the time of suspension (cancellation) of the slip control by the brake ($S_{BC}$)
   $S=0.06$: target slip ratio by the engine ($S_{ET}$)
   $S=0.01-0.02$: slip ratio in the region where the absorb control is effected
   $S=\leq 0.01$: slip ratio in the region where the backup control is effected It is to be noted herein that the above figures are based on data obtained by actually driving a vehicle with spike tires on a frozen road surface. Furthermore, it is noted that the figures $S=0.01-0.02$ in the region where the absorb control is effected and the slip ratio $S=0.09$ at the time of suspension of the slip control by the brake are set as invariable, respectively, on the one hand, and that the target slip ratio $S_{BT}$ by the brake, the target slip ratio $S_{ET}$ by the engine, and the slip ratio $S_s$ at the time of commencement of the slip control vary with a state of road surfaces, on the other hand. In FIG. 5, the target slip ratio $S_{BT}$ by the brake, the target slip ratio $S_{ET}$ by the engine, and the slip ratio $S_s$ at the time of commencement of the slip control are set as 0.17, 0.06, and 0.2, respectively, as one example. It is also noted that the figure $S=0.2$ for the slip ratio at the time of commencement of the slip control uses a slip ratio at the time of the occurrence of the maximum slip force to be obtained when the spike tires were employed, as referred to as the solid line in FIG. 13. The reason why the slip ratio at the time of the commencement of the slip control is set as large as $S=0.2$ is to give an actual slip ratio at the time when the maximum grip force is produced. The target slip ratios $S_{BT}$ and $S_{ET}$ are corrected in accordance with the slip ratio at the time of the occurrence of the maximum grip force. In FIG. 13, the solid line demonstrates a variation in the relationship of magnitudes of grip forces and transverse forces, represented as friction coefficients against road surfaces, during the use of spike tires with the corresponding slip ratios. And the broken line demonstrates a variation in the relationship of magnitudes of grip and transverse forces, represented as friction coefficients against road surfaces, when normal tires are employed, with the corresponding slip ratios.

Given the above description, FIG. 5 will be described in the course of time.

(1) From $t_0$ to $t_1$:

No slip control is conducted over the course of time from $t_0$ to $t_1$ because the slip ratio S does not exceed $S=0.2$ that is the condition for the commencement of the slip control. In other words, when a slip of the driven wheel is small, acceleration can be improved without the slip control, thereby enabling a vehicle to be driven utilizing a large grip force. It is a matter of course that, during this period of time, the peculiar character of the throttle opening against the accelerator opening is determined to be constant as demonstrated in FIG. 12.

(2) From $t_1$ to $t_2$:

At this point $t_1$, the slip control is commenced, and the slip ratio is equal to or higher than the point ($S=0.9$) of the suspension of the slip control by the brake. During the course of time, the slip ratio is so relatively large that the slip control is conducted by the output torque by the engine being reduced and by the braking force being applied by the brake. Since the target slip ratio ($S=0.17$) by the brake is higher than the target slip ratio ($S=0.06$) by the engine, brake pressures are applied to the brake when the spinning is large ($S>0.17$). When the spinning is small ($S>0.17$), however, the spinning is controlled so as to be reduced only by the control of the engine without application of braking liquid pressures to the engine.

(3) From $t_2$ to $t_4$ (recovery control):

For a predetermined period of time (for example, 170 msec) after the slip was reduced (S<0.2), the throttle valve 13 is retained at a predetermined opening (open loop control) in order to cause the driven wheels to produce a maximum grip force. The maximum grip force is obtained from a maximum road surface friction coefficient $\mu$ that is estimated from a maximum acceleration $G_{MAX}$ at the point of S=0.2 ($t_2$). This control is carried out with the attempt to prevent the acceleration G of the vehicle body from being reduced immediately after the slip was reduced, that is, to prevent the overshoot from being occurred (as shown in FIG. 20), when the the feedback control cannot give a timely response in time because of the rapid reduction of the slip. Accordingly, when the reduction of the slip is predicted, that is, when the slip ratio is decreased below S=0.2, a predetermined torque is secured in advance in order to improve acceleration.

Figure 15:

The optimum throttle opening $T_{Vo}$ for providing the driven wheels with torques capable of generating the maximum grip force can be theoretically given by a torque curve of the engine 6 and a transmission gear ratio. In this embodiment, however, the optimum throttle opening $T_{Vo}$ is determined on the basis of a map, for example, as demonstrated in FIG. 15. The map is prepared in accordance with experimental procedures, in which the maximum acceleration $G_{MAX}$ is determined to become a constant value when it is equal to or lower than 0.15 or when it is equal to or higher than 0.4 with measuring errors under consideration. It is to be noted here that, since the mpa indicated in FIG. 15 is prepared on the basis of a particular speed mode such as, for example, the first speed mode, a map for any other speed mode can be prepared by correcting the optimum throttle opening $T_{Vo}$.

(4) From $t_4$ to $t_7$ (backup control and absorb control):

The backup control is designed to be conducted (open loop control) in order to cope with an unusual reduction in the slip ratio S. When the slip ratio S becomes lower than S=0.01, the feedback control is stopped and the throttle valve 13 is caused to be opened in a stepwise manner. If the slip ratio is between 0.01 and 0.02, the absorb control is conducted in order to transferred the backup control to the next feedback control in a smooth manner (from $t_4$ to $t_5$ and from $t_6$ to $t_7$). This backup control is conducted when neither the feedback control nor the recovery control can work effectively. Of course, the backup control is designed so as to give a quicker response time than the feedback control.

A rate of an increase in the throttle opening in the backup control, in this embodiment, is designed so as to be added by 0.5% of the previous throttle opening for every 14 msec of the sampling time.

Figure 16:
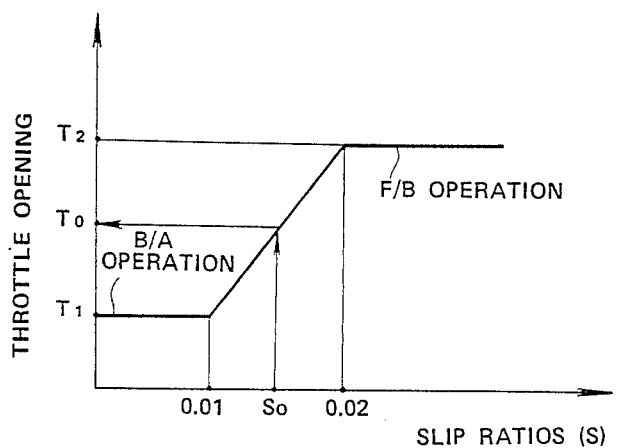

In the absorb control, as shown in FIG. 16, a throttle opening $T_0$ is determined by proportionating a throttle opening $T_1$ obtained by the operation of the backup control and a throttle opening $T_2$ obtained by the operation of the feedback control with the present slip ratio $S_0$.

(5) From $t_7$ to $t_8$:

By continuing the control conducted until the point $t_7$, the control is caused to be transferred smoothly into the slip control by the engine alone.

(6) $t_8$ et seq.

The slip control is suspended because the accelerator 69 is fully closed by the operator D. At this time, there is no risk of re-occurrence of a slip even if the throttle opening of the throttle valve 13 is left in the discretion of the operator D, because the torques are caused to be decreased to a sufficient level. In this embodiment, the slip control is caused to be suspended, in addition to the full closure of the accelerator 69, when the target throttle opening by the slip control becomes smaller than the throttle opening determined by FIG. 12 corresponding to the accelerator opening to be operated by the operator.

Detailed Description of Slip Control

In accordance with the present invention, the overall slip control system will be described below with reference to FIGS. 6 to 11, inclusive. In this embodiment, it should be noted that the control can be also made using the brake control to get free from the mud or the like—this control will be referred to herein as a so-called "stuck control". In the following description, reference symbol P denotes a step.

Figure 6A:
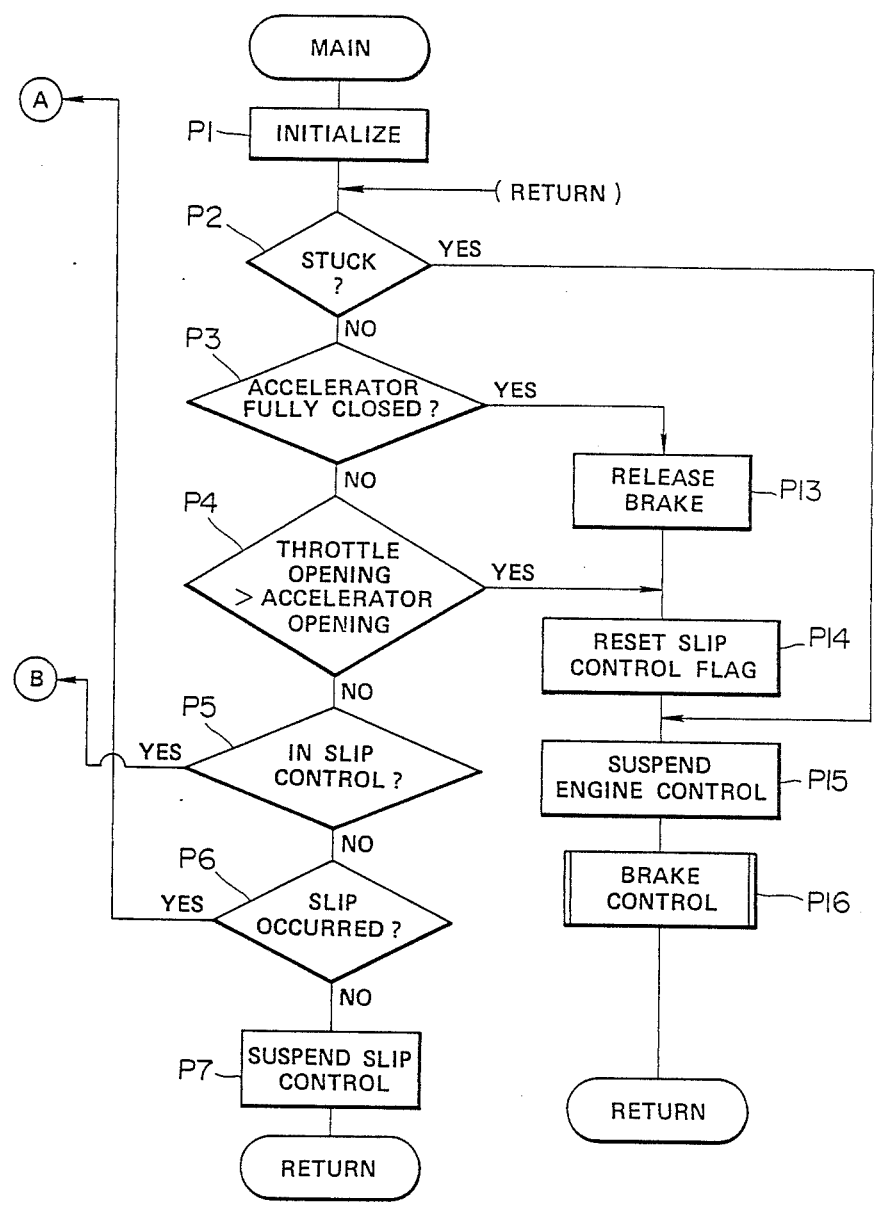
Figure 6B:
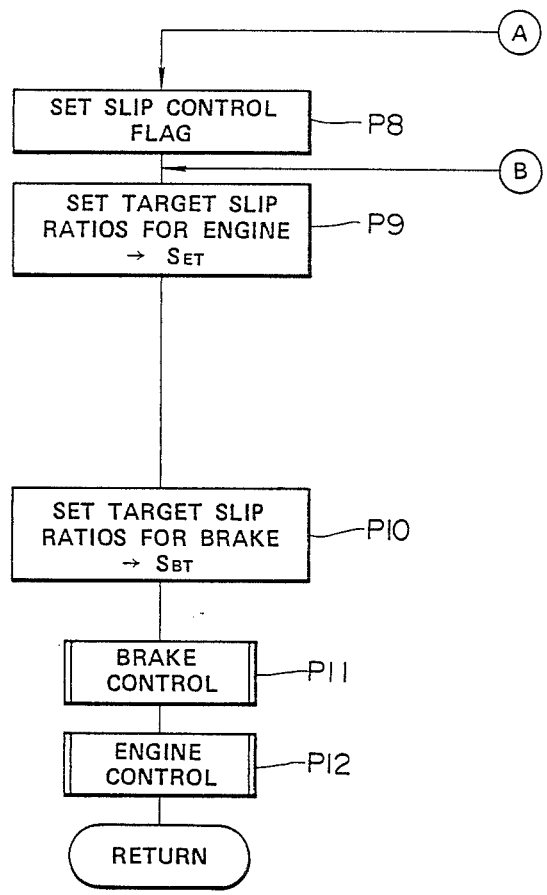

FIG. 6 (Main Routine)

In P1, the system is initialized, and it is discriminated in P2 whether or not a vehicle is in a stuck state or whether or not it is stuck in the mud and consequently in an unmovable state. This discrimination is made by seeing whether or not a stuck flag is set as will be described below. If NO in P2, the flow proceeds the P3 and it is then discriminated whether or not the accelerator 69 is completely closed. If NO in P3, it is then discriminated in P4 whether or not the present throttle opening is larger than the accelerator opening. If it is discriminated as NO in P4, the flow proceeds to P5 and it is then discriminated whether or not it is in the progress of the slip control. This discrimination is conducted by checking whether or not a slip control flag is set. If NO is in P5, it is discriminated in P6 whether or not the slip or spinning would have occurred to a degree such that the slip control was required. This is discriminated by seeing whether a slip flag for the left front wheel 2 and the right front wheel 3 is set. If it is discriminated NO in P6, the flow proceeds to P7 and the slip control is suspended, leading to the normal driving.

If YES in P6, the flow proceeds to P8 where a slip control flag is set. Then, in P9 and P10, the target slip ratio $S_{ET}$ for the engine and the target slip ratio $S_{BT}$ for the brake, respectively, are determined on the basis of each of input signals for the acceleration G, the steered angle D of the steering wheel, and the vehicle speed V (FIGS. 21 to 23). Thereafter, for the slip control, the brake control is effected in P11 and the engine control is done in P12, as will be described below.

In P5, if it is discriminated as YES, the flow proceeds to P9 and the slip control continues to be done.

If YES in P4, it is shown that no slip control is required and the flow advances to P14 where a slip control flag is reset. Then, the engine control is suspended in P15, and the brake control is conducted in P16. This brake control in P16 is done so as to cope with a state where a vehicle is stuck.

In P3, if it is discriminated YES, the flow proceeds to P13 where the brake is released and treatments are done in P14 and thereafter.

If YES in P2, the flow proceeds to P15 and the treatments following P15 are conducted.

FIGS. 7 & 8

Figure 7:
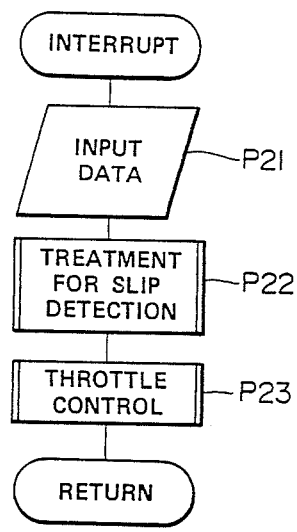

The flowchart demonstrated in FIG. 7 is designed so as to interrupt into the main flowchart demonstrated in FIG. 6, for example, in every 14 msec.

In P21, signals from each of the sensors 61 to 68, inclusive, are input for data treatments. The flow then proceeds to P22 and the treatment of slip detection is conducted, and then, in P23, the throttle control is conducted.

Figure 8:
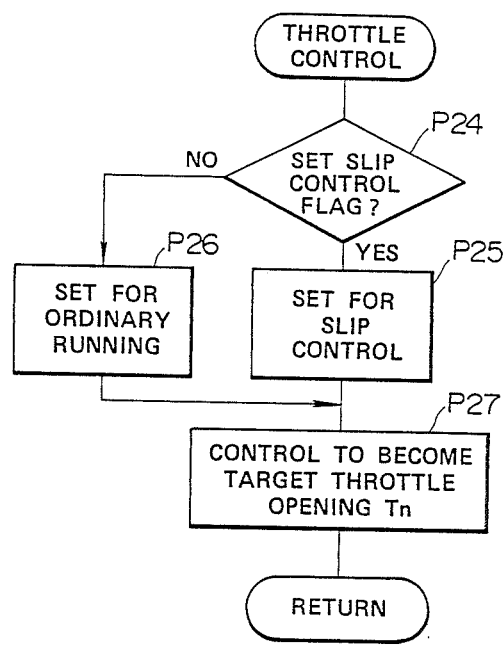

The throttle control in P23 is effected in accordance with a flowchart demonstrated in FIG. 8. In P24, it is discriminated whether or not a flag for the slip control is set, that is, whether or not the slip control is currently under way. If YES in P24, on the one hand, the throttle valve 13 is controlled so as to select the control mode capable of reaching the predetermined target slip ratio $S_{ET}$ for the slip control, that is, without following the peculiar character demonstrated in FIG. 12. If NO in P24, on the other, the flow proceeds to P26 and the opening or closing of the throttle valve 13 is regulated by the operator D in his discretion, leading to the peculiar character demonstrated in FIG. 2. Subsequent to P25 and P26, the control is carried out, in P27, to realize the target throttle opening, as will be described below, that is, the control following P68, P70 and P71 and the control following the character of FIG. 12 are conducted as will be described below.

Figure 9A:
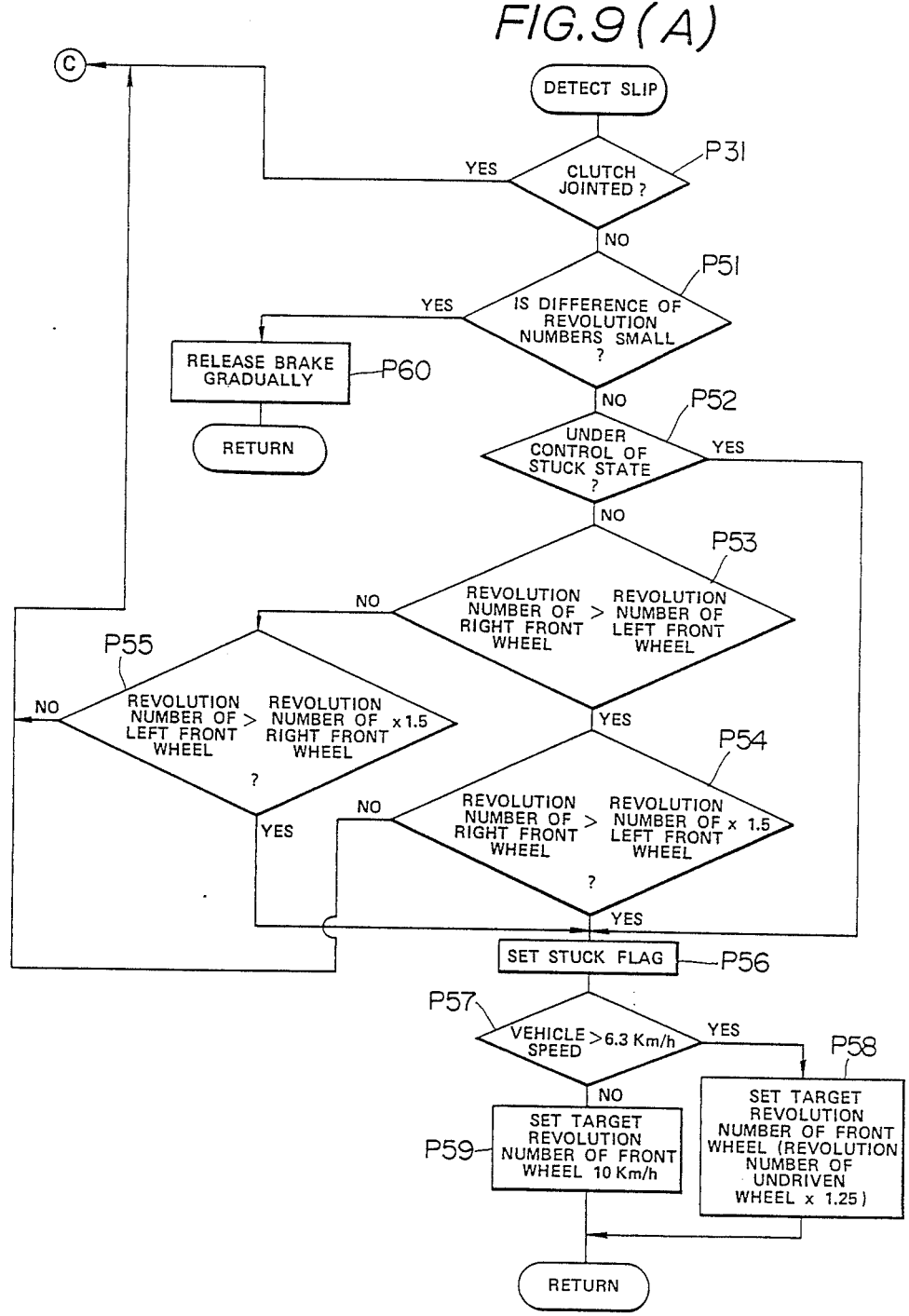
Figure 9:
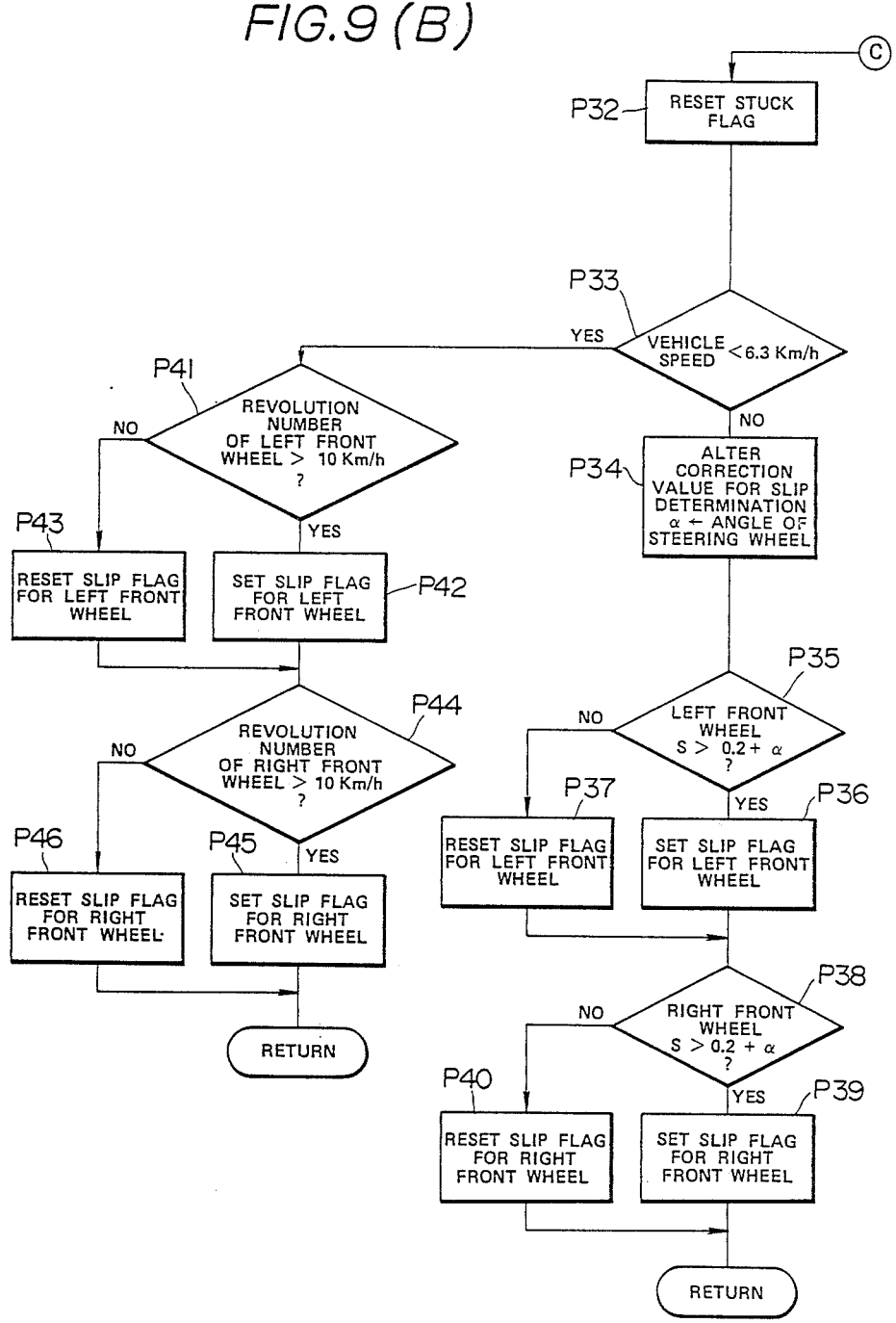

FIG. 9 (Slip Detection)

The flowchart of FIG. 9 corresponds to P22 of FIG. 7 and is to detect whether or not the slip or spinning subject to the slip control has occurred and is to detect whether or not a vehicle is stuck.

In P31, it is discriminated whether or not the clutch 7 is completely connected. If YES in P31, it is found that the vehicle is not stuck. Then, the flow proceeds to P32 where a Stuck Flag is reset and, in P33, it is discriminated whether or not the present vehicle speed is as slow as, for example, below 6.3 km/h.

Figure 14:
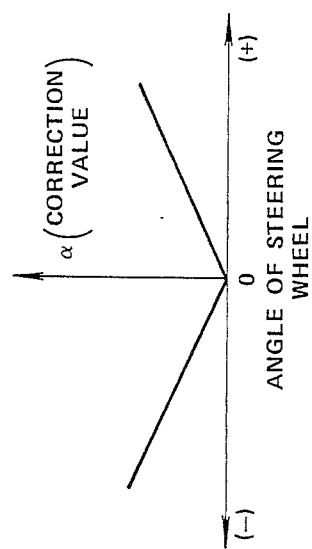

If NO in P33, the flow proceeds to P33 where a correction value g for the slip detection is computed in accordance with a steered angle of the steering wheel 70, as referred to in FIG. 14. Thereafter, in P35, it is discriminated whetehr or not a slip ratio for the left front wheel 2 as the lefthand driven wheel is larger than an addition of the above correction value α to the determined reference value of 0.2, that is, 0.2+α. If YES in P35, on the one hand, it is found that the left front wheel 2 is in a state of slippage so that a slip flag is set in P36. If NO in P35, the flow proceeds to P37 where a slip flag for the left front wheel 2 is reset. It is noted here that the correction value α is determined with a difference of revolutions between the inner and outer wheels at the time of the spinning, particularly a difference of revolutions between the driven wheel and the undriven wheel.

Subsequent to P36 and P37, a slip ratio for the right front wheel 3 is discriminated in P38 in substantially the same manner as described above on the left front wheel 2. If YES in P38, a slip flag for the right front wheel 3 is set in P39 and, if NO in P38, a slip flag therefor is reset in P40.

When it is discriminated as YES in P33, the vehicle speed is so slow that the computation of the slip ratio based on the relationship (1) utilizing the vehicle speed is predicted to give high errors in measurement. Accordingly, in this case, a state of slippage is determined merely by the detection of the numbers of revolutions of the driven wheels. That is, in P41, it is discriminated whether or not the number of revolutions of the left front wheel 2 is larger than that corresponding to the vehicle speed of 10 km/h. If YES in P41, a slip flag for the left front wheel 2 is set in P42 and, if NO in P41, a slip flag for the left front wheel 2 is reset.

After P42 and P43, a slip flag for the right front wheel 3 is set or reset in P44, P45 and P46 in substantially the same manner as in P41 to P43.

In P31, if it is discriminated as NO, there is the possibility that the vehicle is stuck. In this case, an operator D will try to get the vehicle free from the stuck state, as in the mud, with the clutch connected halfway. At this moment, the flow moves to P51 where it is discriminated whether or not a difference of the revolution numbers between the left and right front wheels 2 and 3 as the driven wheels is small (as large as, for example, 2 km/h, when the number of revolutions is translated into the vehicle speed). If NO in P51, it is discriminated in P52 whether or not the vehicle is currently in the progress of the stuck control. If NO in P52, it is discriminated in P53 whether or not the number of revolution of the right front wheel 3 is larger than the number of revolutions of the left front wheel 2. If YES in P53, it is discriminated in P54 whether or not the number of revolutions of the right front wheel 3 is larger than 1.5 times as much as the number of revolutions of the left front wheel 3. If YES in P54, on the one hand, a Stuck Flag is set in P56 and, if NO in P54, on the other hand, it is found that the vehicle is not stuck so that the treatments following P32, as described above, will be carried out.

If NO in P53, it is discriminated in P55 whether or not the number of revolutions of the left front wheel 2 is larger than 1.5 times as much as the number of revolutions of the right front wheel 3. If YES in P55, the flow proceeds to P56 and, if NO in P55, the flow proceeds to P32.

After P56, it is discriminated in P57 whether or not the vehicle speed is faster than 6.3 km/h. If YES in P57, it is set in P58 such that the numbers of revolutions of the front wheels 2 and 3 become 1.25 times as much as the numbers of revolutions of the respective leading wheels representing the vehicle speed equivalent to the slip ratio S=0.2. If NO in P57, the target numbers of revolutions of the front wheels 2 and 3 are set to be equivalent each to the vehicle speed of 10 km/h in P59.

If YES in P51, the brake is released gradually in P60. If YES in P52, the flow proceeds directly to P56 without any treatment to be done in P53, P54 and P55.

Figure 10:
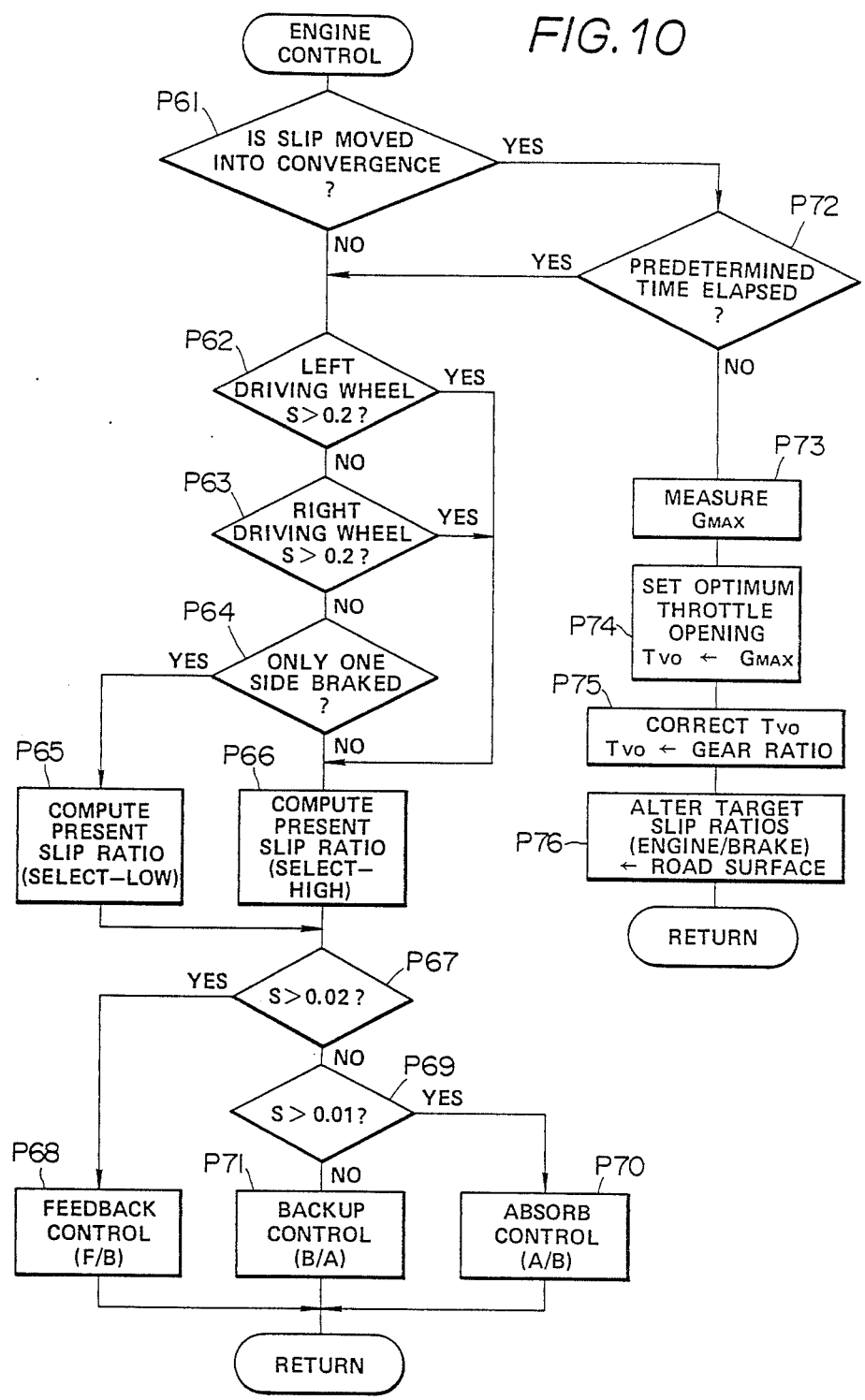

FIG. 10 (Engine Control)

The flow chart of FIG. 10 corresponds to P12 of FIG. 6.

In P61, it is discriminated whether or not a state of the slip is moved into a reducing state, or whether the point $t_2$ of FIG. 5 is passed. If NO in P61, it is discriminated in P62 whether or not the slip ratio of the left front wheel 2 is larger than S=0.2. If NO in P62, it is discriminated in P63 whether or not the slip ratio of the right front wheel 3 is larger than S=0.2. If NO in P63, it is discriminated in P64 whether or not only one of the left and right front wheels 2 and 3 is under the brake control, viz., whether or not the vehicle is running on a split road. If YES in P64, on the one hand, the flow proceeds to P65 and the present slip ratio is set to the driven wheel with the lower slip ratio (select-low). If NO in P64, on the other hand, the flow proceeds to P66 and the present slip ratio is set to the driven wheel with the higher slip ratio (select-high). If YES in P62 and in P63, the flow proceeds to P66 in each case.

The select-high step in P66 is to enable the frequency of the braking to be lessened more by computing the present slip ratio in such a way that the slip or spinning of the driven wheel that is likely to slip more than the other driven wheel is controlled. The select-low step in P65 is to enable the slip or spinning of the driven wheel likely to slip more than the other to be controlled by the brake and, at the same time, to enable the vehicle to be driven using the grip force produced by the driven wheel that is less slippery, when the vehicle is running on a road such as a split road having different friction coefficients on road surfaces with which the left and right driven wheels are in contact. In the select-low step, it is preferred to limit its use, for example, to a particular period of time in order to avoid the excessive use of the brake or to provide backup means for suspending the select-low step in the event of the brake being overheated.

After P65 or P66, it is discriminated in P67 whether or not the present slip ratio is larger than S=0.02. If YES in P67, the throttle valve 13 is regulated for the slip control by way of the feedback control in P68.

If NO in P67, it is discriminated in P69 whether or not the present slip ratio is larger than S=0.01. If YES in P69, the flow proceeds to P70 and the absorb control is made as have been described above. If NO in P69, the backup control is done in P71, as have been described above.

If YES in P61, the flow proceeds to P72 where it is discriminated whether or not a predetermined period of time has passed after the slip reduced, viz., whether or not a period of time for the recovery control has passed—170 msec in this embodiment. If NO in P72, the treatments following P73 are carried out to effect the recovery control. That is, in P72, the maximum acceleration $G_{MAX}$ of the automobile 1 is measured at the point $t_2$ of FIG. 5 and, in P74, the optimum throttle opening $T_{Vo}$ capable of obtaining the maximum acceleration $G_{MAX}$ is set as shown in FIG. 15. Then, in P75, the optimum throttle opening $T_{Vo}$ obtained in P74 is corrected in accordance with the present speed mode of the transmission 8. Since the torques applied to the driven wheels vary with the speed mode, it is noted in this embodiment that the optimum throttle opening $T_{Vo}$ is set in P74 for a reference speed mode and then in P75, the difference of the speed mode is corrected. Thereafter, in P76, the target slip ratio $S_{ET}$ for the slip control by the engine (throttle) and the target slip ratio $S_{BT}$ for the slip control by the brake are altered by estimating a road surface friction coefficient from the maximum acceleration $G_{MAX}$ obtained in P73. Alteration of the target slip ratios $S_{BT}$ and will be described below.

If YES in P72, it is found that the recovery control is finished so that the flow proceeds to P62 for the further treatments as have been described.

Figure 11:
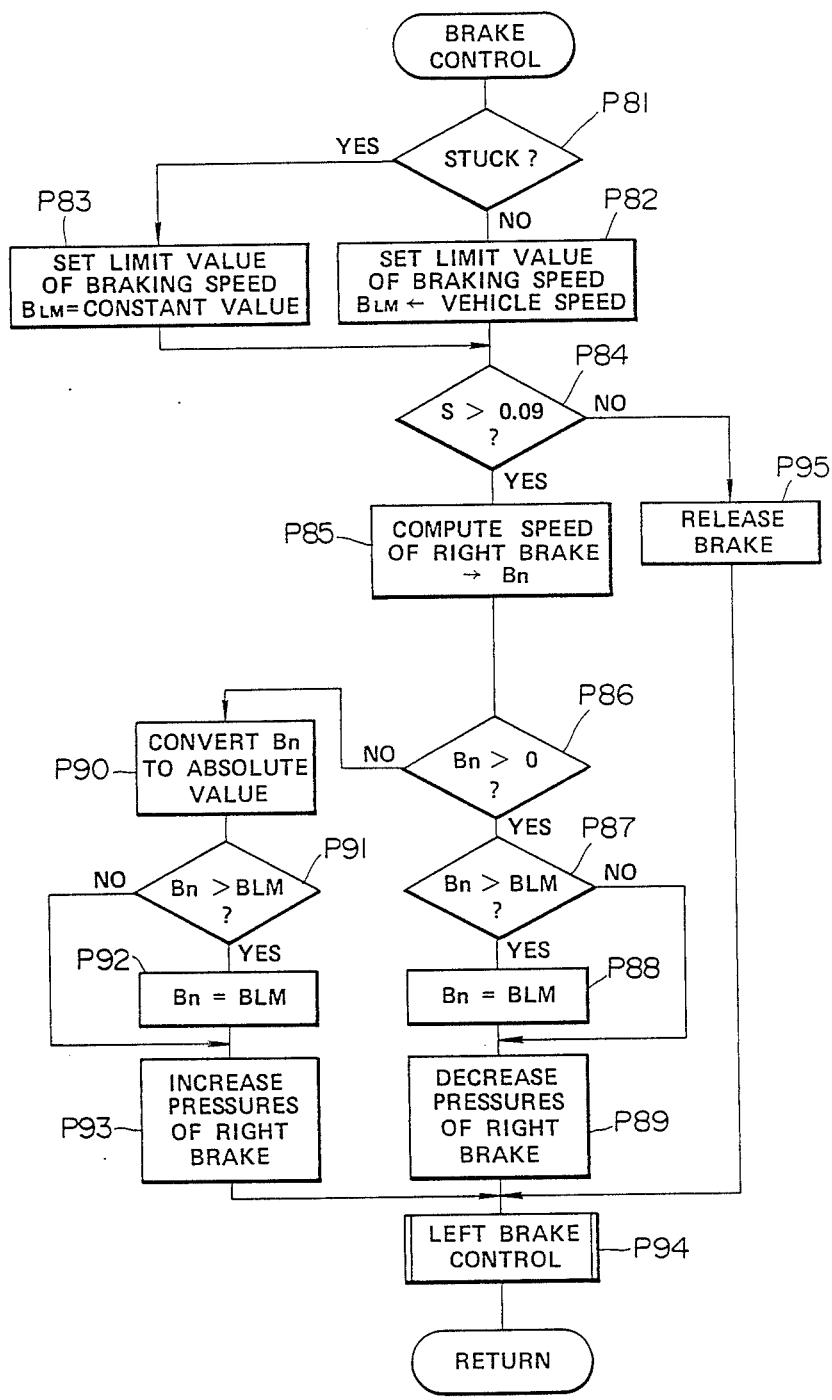

FIG. 11 (Brake Control)

The flowchart of FIG. 11 corresponds to P11 and P12 of FIG. 6.

It is discriminated in P81 whether or not the vehicle is stuck in the mud or the like. If NO in P81, the flow advances to P82 and the limit value (maximum value) $B_{LM}$ of a response speed Bn of the brake equivalent to the duty ratio for the opening or closing control of the valves SV1 to SV4 is set as a function variable in accordance with a vehicle speed—a function becoming larger as the vehicle speed gets faster. If YES in P81, the limit value $B_{LM}$ is set in P83 to be a constant value smaller than the limit value $B_{LM}$ of P82. The treatments in P82 and P83 are arranged with the attempt unlikely to cause any vibration to occur on account of a speed of an increase or decrease in the brake pressure becoming too fast if the brake response and speed BM computed by the relationship (5) above is used as it is. In addition, it is particularly undesirable to cause the braking force on the driven wheels to vary rapidly in order to get the vehicle free from the stuck state so that the limit value $B_{LM}$ in P83 is set smaller than that in P82.

After P82 or P83, it is discriminated in P84 whether or not the slip ratio is larger than S=0.09 that is the point of the brake control being suspended. If YES in P84, an operation speed Bn of the brake 22 for the right front wheel is computed in P85, which is equivalent to Bn in the I-PD control of FIG. 4. Thereafter, in P86, it is discriminated whether or not the operation speed BN is larger than zero. This discrimination is made by seeing whether or not the brake pressure is in the decreasing direction when the direction of decreasing the brake pressure is considered as a positive value and the direction of increasing the brake pressure as a negative value. If YES in P86, it is discriminated in P87 whether or not Bn is larger than $B_{LM}$. If YES in P86, on the one hand, Bn is set to the limit value $B_{LM}$ in P88 and then in P89, the brake pressure of the right brake 22 is decreased. If NO in P87, the flow proceeds to P89 and the brake pressure thereof is decreased in accordance with Bn set in P85.

When NO at P86, it is found that Bn is a negative value or zero so that Bn is converted in P90 to the corresponding absolute value followed by the treatments in P91 to P93, inclusive. The treatments in P91 to P93 are carried out to increase the brake pressure of the right brake 22 as in substantially the same manner as those in P87 to P89, inclusive. If NO in P84, the flow proceeds to P95 and the brake control is suspended by the release of the brake.

After P89, P93 or P95, the flow proceeds to P94 where the brake pressure of the left brake 21 is increased or decreased in substantially the same manner as that of the right brake 22 is treated in P84 to P93, P95 inclusive.

It is noted herein that, if the difference between the actual revolution numbers and target revolution numbers (an actual slip ratio and the target slip ratio) is large, the correction of the integral coefficient $K_1$ in the above relationship (5), for example, is preferable in order to prevent the acceleration from being impaired by the excessive use of the brake and the engine from being stalled. This correction may be done by said $K_1$ is caused to become smaller in a step between P85 and P86.

Alteration of Target Slip Ratios $S_{ET}$ and $S_{BT}$ (P76)

Figure 17:
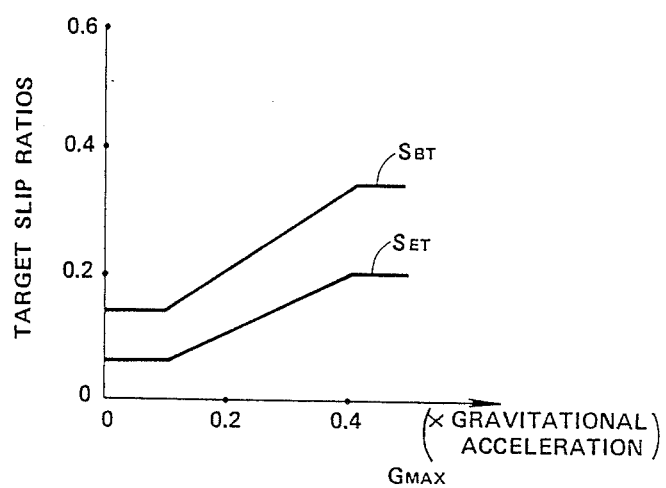

In P76, the target slip ratio $S_{ET}$ for the engine and $S_{BT}$ for the brake to be altered, as demonstrated in FIG. 17, on the basis of the maximum acceleration $G_{MAX}$ measured in P73. As apparent from FIG. 17, the slip ratios $S_{ET}$ and $S_{BT}$, as a rule, get larger as the maximum acceleration $G_{MAX}$ gets larger, and each of the limit value therefor is set.

The following is a description on an influence of the determination of the target slip ratios $S_{ET}$ and $S_{BT}$ on the driving of the automobile 1.

(1) Grip Forces of Driven Wheels

The target slip ratios $S_{ET}$ and $S_{BT}$ are offset as a whole in the upward or downward direction of FIG. 17. In order to make the grip force greater, they are offset in the upward direction. This can be said true as long as the slip ratio in the range of 0.2 to 0.3 or below is used because the road surface friction coefficient $\mu$ is in the increasing direction up to the slip ratio being 0.2 to 0.3 as the peculiar character of spike tires, as shown in FIG. 13.

(2) Acceleration Feelings

The acceleration feeling varies with a difference between the target slip ratios $S_{ET}$ and $S_{BT}$. Acceleration is felt greater as the difference therebetween gets smaller. As in this embodiment, in instances where the target slip ratio $S_{ET}$ for the engine is set smaller than the target slip ratio $S_{BT}$ for the brake, the brake control mainly works when the slip ratio of the driven wheel is larger and the engine control mainly works when the slip ratio of the driven wheel is smaller. Accordingly, if the difference between the target slip ratios $S_{ET}$ and $S_{BT}$ is small, the engine control and the brake control work in a direction equally proportional to each other. That is, in this case, the driven wheels are driven in a state that the torques generated by the engine are reduced by the brake so that the torques to be transmitted to the driven wheels are caused to be increased without a delay in a response merely by releasing the brake when the torques are required to be increased rapidly for acceleration.

(3) Smoothness in Acceleration

A smoothness in acceleration can be attained when the target slip ratio $S_{BT}$ for the brake gets large, viz., relatively large as compared to the target slip ratio $S_{ET}$ for the engine. In this case, the engine control is caused to prevail over the brake control, thereby leading to the effective occurrence of a smooth variation in torques, which is the advantage of the engine control.

(4) Cornering Stability

A stability during the cornering can be obtained when the target slip ratio $S_{ET}$ for the engine gets small, viz., relatively small compared to the target slip ratio $S_{BT}$ for the brake. As will be apparent from FIG. 13, in the region from S=0.2 to S=0.3 or below, where the maximum grip force is created, the reduction in the target slip ratio can make the grip forces of the driven wheels smaller and, at the same time, make the transverse force as large as possible.

The characteristic modes are represented by (1) to (4) above, may be selected automatically or manually by the operator D (mode selection).

In the embodiments described above, the target slip ratio $S_{BT}$ for the brake is set larger than the target slip ratio $S_{ET}$ for the engine so that no brake control is carried out when a degree of the slip or spinning is small, leading to a less frequency of uses of the brake, and that a burden of the brake control is lessened even when a large slip or spinning occurs. In addition, since there is set the intermediate point ($S_{BC}$) between the target slip ratios $S_{BT}$ and $S_{ET}$, where the slip control by the brake is suspended, the brake pressure is caused to be decreased to a sufficient degree at the time of the suspension of the brake control so that a rapid variation in torques is caused unlikely to occur.

Automatic Drive Control

The following is a description on the automatic drive control with reference to FIGS. 24 to 28 in the case where an automatic drive control device is taken as an example of the loaded device controlling apparatus according to the present invention.

Figure 24:
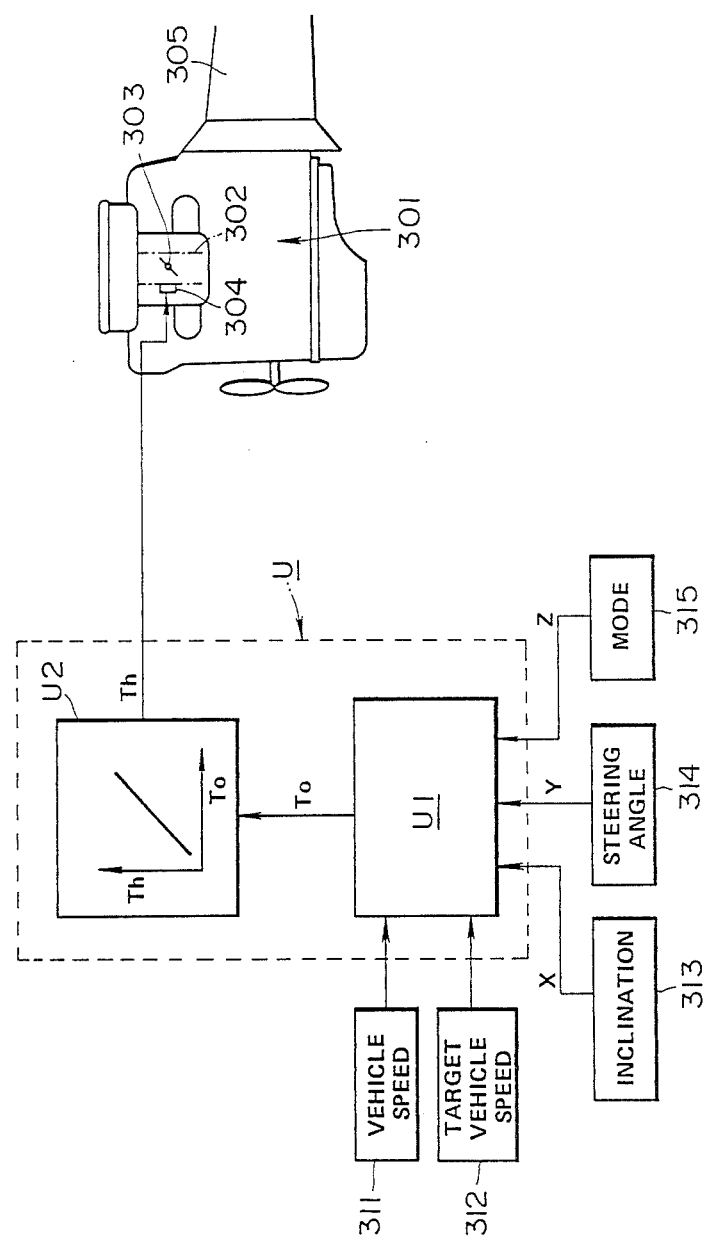

Referring to FIG. 24, reference numeral 301 denotes an engine, and a throttle valve 303 mounted in an intake air passage 302 is driven by an actuator 304 of the electromagnetic type. An output from the engine 301 is transmitted through an automatic transmission 305 to the driven wheels (not shown).

The actuator 304 is controlled by a control unit U, thus controlling the throttle valve 303. In this embodiment, the control unit U contains a vehicle speed control subunit U1 consisting of a microcomputer, and a throttle controller U2. The vehicle speed control subunit U1 generates a throttle opening signal $T_0$, and the throttle controller U2 drives the actuator 304 so as for the throttle opening to become Tn corresponding to the throttle opening signal $T_0$. During the automatic drive control being conducted, a response speed to cause an actual vehicle speed to correspond to the target vehicle speed is adjusted by a speed at which the throttle opening signal $T_0$ varies, that is, as a consequence, at a speed of driving the throttle valve 303.

Figure 25:
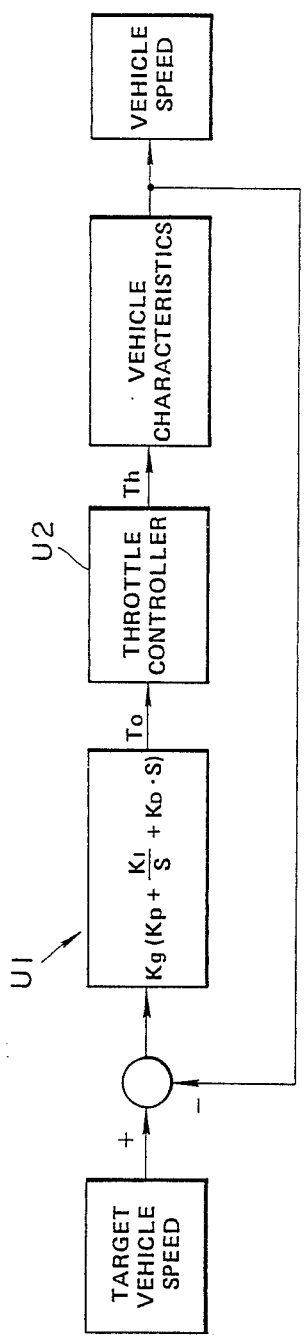
Figure 29:
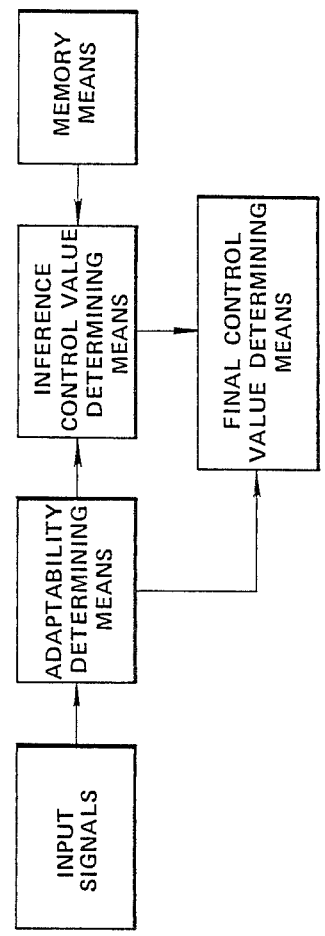
FIG. 29 is a block diagram illustrating the basic construction according to the present invention.

A signal from each of the sensors or switches 311 to 315 is input into the vehicle speed control subunit U1. The sensor 311 is to detect an actual vehicle speed. The switch 312 is to set a target vehicle speed by the operation of a driver. The sensor 313 is to detect a road inclination. The sensor 314 is to detect a steered angle of a steering wheel. The sensor 315 is to detect a state of a speed mode (power mode, economy mode, etc.) of the automatic transmission 305. More specifically, the vehicle speed control subunit U1 is designed capable of controlling the vehicle speed so as to cause the actual vehicle speed to become the target vehicle speed by means of the PID control as shown as a block diagram in FIG. 25. In FIG. 25, $K_P$ denotes a proportional coefficient, $K_1$ denotes an integral coefficient, $K_0$ denotes a differential coefficient, Kg denotes a gain coefficient, and S denotes an operator.

The vehicle speed control subunit U1 is controlled so as to alter magnitudes of the gain coefficients Kg (control gains) in accordance with an output from each of the sensors, thus leading to alteration of a response speed for reaching the target vehicle speed. For instance, when the actual vehicle speed is slowed down on an ascending slope, the throttle valve 303 is allowed to be opened earlier as the slope gets greater, whereby the feeling of delaying in returning to the target vehicle speed is unlikely to occur. On the contrary, when a steered angle of the steering wheel gets larger during cornering at a small radius, the opening of the throttle valve is changed slower than during the straight running, thus providing the feeling of driving in a stabler manner. Furthermore, at the time of the power mode in which more emphasis is placed on an output, the throttle valve opening is changed earlier than the economy mode in which more emphasis is placed on a mileage, whereby much importance is attached on the running of the vehicle.

Figure 27:
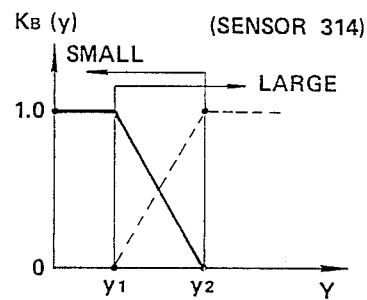
Figure 28:
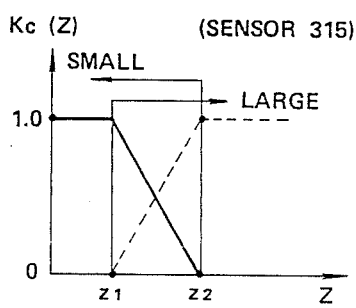

In the following description, it is noted that a signal value from the sensor 313 is set as X (FIG. 26), a signal value from the sensor 314 is set as Y (FIG. 27), and a signal value from the sensor 315 is set as Z (FIG. 28).

Figure 26:
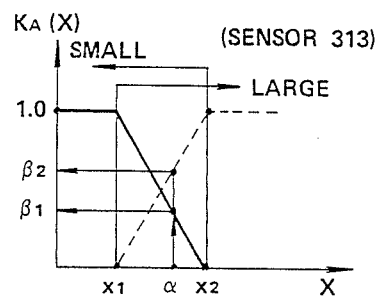

FIGS. 26 to 28 correspond to FIGS. 18 to 20, respectively. It is to be noted here that the gain coefficient Kg as a final control value can be obtained in substantially the same manner as have been described above for the slip control, using the following relationship (8) with reference to Table 4 corresponding to Tables 2 and 3 above. Description in duplicate will be omitted herefrom for brevity.

$$Kg = \frac{\sum_{i=1}^{8} Mi}{\sum_{i=1}^{8} Wi} \quad (8)$$

TABLE 4

| RULES | SIGNAL VALUES G | SIGNAL VALUES D | SIGNAL VALUES V | BASIC VALUES Ti | ADAPT-ABILITY Wi | INFERENCE VALUE Mi |
|---|---|---|---|---|---|---|
| R1 | S | S | S | T1 | W1 | M1 |
| R2 | S | S | L | T2 | W2 | M2 |
| R3 | S | L | S | T3 | W3 | M3 |
| R4 | S | L | L | T4 | W4 | M4 |
| R5 | L | S | S | T5 | W5 | M5 |
| R6 | L | S | L | T6 | W6 | M6 |
| R7 | L | L | S | T7 | W7 | M7 |
| R8 | L | L | L | T8 | W8 | M8 |

Notes:
S = Small control zone; L = Larger control zone;
Wi = $K_A \times K_B \times K_C$; Mi = Ti × Wi In accordance with the present invention, the embodiments have been described, but it should be understood that the present invention is by no means construed to be limited to the embodiments above and any changes or modifications as will be described below should be encompassed within the scope of the present invention.

(a) When a computer is utilized, it may be of the digital type or of the analog type.

(b) The number of control zones to be set for each of input signals may be changed. It may be increased when it is necessary to change control valves ($S_{ET}$, $S_{BT}$, and Kg) to a large extent even if the respective signal values are to be changed to a small extent.

(c) It is not necessary to set a control zone for each of the input signals in an equal manner. For instance, in setting two control zones, the boundary of the two control zones may be determined to a region closer to the side of the larger signal value when the side of the larger signal value is required to be varied to a larger extent than the side of the smaller signal value.

(d) An adaptability for the control zone, particularly in a region when the adaptability is set to vary from 0 to 1.0, may be described conveniently in accordance with the multiple function, in addition to the linear function as expressed in FIGS. 18 to 20 as well as in FIGS. 26 to 28.

(e) The apparatus according to the present invention may be applied as a whole to a control system or as a portion of the whole control system.

A whole control system may be constructed in such a manner as consisting of a first system for obtaining a first final control value from a group of plural input signals in accordance with the present invention, a second system for obtaining a second final control value from another group of plural input signals in accordance with the present invention, and a third system for obtaining a third final control value from the first and second final control values in accordance with the present invention.

(f) The present invention is particularly preferred when it is not necessary to increase the number of control zones for one input signal too much. From this point of view, it is suitable particularly when the control is conducted so as to be adapted to the perception of an operator. For instance, it is suitable for controlling the switching speed of an automatic clutch, the switching speed of friction elements for switching the power transmission passage of an automatic transmission for prevention of shocks during the shift of speed modes, and a speed of altering air-fuel ratios in an engine of the type of air-fuel ratios being altered.

(g) The number of input signals to be used for determination of the final control values ($S_{ET}$, $S_{BT}$, and Kg) may be two or more than 4. It is to be understood that kinds of the input signals are not limited to those used in this embodiment and that there may be employed a variety of input signals such as a road inclination, a loadage, a mode to be input manually by an operator, a change gear pattern of a transmission being an automatic transmission of the type variable in change gear patterns, and so on.

(h) In the slip control, it is preferred to alter or control a factor that may exert the greatest impact on the output of an engine, as a way of adjusting the output torque of the engine 6. It is preferred that the torque output may be adjusted by a so-called load control, that an amount of a mixture fuel may be adjusted for the Otto-type engine such as, for example, a gasoline engine and an amount of a fuel injection may be adjusted for a diesel engine. In addition to the load control, an ignition timing may be adjusted for the Otto-type engine and the timing of the fuel injection may be adjusted for the diesel engine, too. In a supercharged engine, a supercharged pressure may be adjusted. Of course, a power source may include, in addition to an internal combustion engine, an electric motor. In this case, the output torque may be adjusted by the adjustment of an electric power to be supplied to the motor. It is also preferred that, for the adjustment of the output torque in the power-plant system, a state of connection of the clutch 7 or a transmission gear ratio of the transmission 8 as well as the engine may be adjusted. In this case, a continuously variable transmission (CVT) is particularly preferred.

The automobile 1 may include, in addition to the one with the front wheels 2 and 3 as the driven wheels, ones with the rear wheels 4 and 5 as the driven wheels and with all the four wheels as the driven wheels.

In order to detect a state of the slip or spinning of the driven wheels, it may be detected directly from the number of revolutions of the driven wheel as in this embodiment above and indirectly by predicting a state of the slip or spinning thereof from a state of the vehicle. Such a state of the vehicle may include, for example, an increase in the output torque of a power source or in the number of revolutions, a variation in the accelerator opening, a variation in the revolution of the driving shaft, a state of a steering wheel (cornering), a state of the vehicle body lifted (acceleration), and a loadage. In addition to these factors, a road surface friction coefficient $\mu$ upon a magnitude of atmospheric temperatures, a rainfall, a snowfall or on an iced road may be detected automatically or input manually to predict a state of the slip or spinning of the driven wheels more adequately.

The hydraulic brake pressure regulating circuit in FIG. 2 and the sensors 64, 65 and 66 may be composed of a known ABS (anti-brake lock system).

The slip control of the driven wheels may be conducted only by adjustment of the output torque of the engine or mainly using a brake in such a manner that the target slip ratio $S_{BT}$ for the brake is set smaller than the target slip ratio $S_{ET}$ for the engine. The slip control also may be made using either of an engine or a brake as well as using a transmission, particularly of the non-stage type.

It is to be understood that the foregoing text and drawings relate to embodiments of the present invention given by way of examples but not limitation. Various other embodiments and variants are possible within the spirit and scope of the present invention.

What is claimed is:

1. In a control apparatus for controlling a device loaded on a vehicle in which a control value therefor is on the basis of plural input signals, said control apparatus comprising:

basic control value memorizing means for memorizing a basic control value obtained for every combination of plural control zones present for every signal value of said input signals;

adaptability determining means for determining a second adaptability for every combination from a first adaptability obtained for every control zone with respect to every combination of said control zones;

inference control value determining means for determining an inference control value for every combination from said basic control value and said second adaptability; and final control value determining means for determining a final control value from said second adaptabilities and said inference control values.

2. A control apparatus as claimed in claim 1, wherein the number of said control zones is two, a first control zone being set for a larger signal value and a second control zone being for smaller signal value.

3. A control apparatus as claimed in claim 2, wherein:

a signal value for an input signal comprises a first value and a second value larger than the first value;

a first adaptability for said first control zone is 0 to 0% and a first adaptability for said second control zone is 1.0 or 100% when the signal value of said input signal is smaller than said first value;

a first adaptability for said first control zone is 1.0 or 100% and a first adaptability for said second control zone is 0 to 0% when the signal value of said input signal is larger than said second value; and said first adaptability or said first control zone gets larger and said first adaptability for said second control zone gets smaller as the signal value gets larger, when the signal value is between said first value and said second value.

4. A control apparatus as claimed in claim 1, wherein:

said first adaptability for each of said control zones is set as a value ranging from 0 to 1.0; and a second adaptability for each combination is obtained by multiplying all of said first adaptabilities.

5. A control apparatus as claimed in claim 1, wherein said adaptability determining means comprises:

adaptability memorizing means for memorizing a first adaptability as a value in the range from 0 to 1.0;

first adaptability determining means for determining a first adaptability for each of said signals by referring a value of each of said input signals to said adaptability memorizing means; and second adaptability determining means for determining a second adaptability for every combination of said control zones by multiplying said first adaptabilities determined by said first adaptability determining means.

6. A control apparatus as claimed in claim 1, wherein:

said adaptability for each combination is determined as a value in the range between 0 and 1.0 by said adaptability determining means; and said inference control value determining means gives said inference control value by multiplying said basic control value by said second adaptability determined by said adaptability determining means.

7. A control apparatus as claimed in claim 1, wherein:

said second adaptability for each combination is determined as a value in the range betwen 0 and 1.0 by said adaptability determining means;

said inference control value determining means gives said inference control value by multiplying said basic control value by said second adaptability determined by said adaptability determining means; and said final control value determining means gives said final control value by dividing an addition of all said inference values by an addition of all said second adaptabilities.

8. In a control apparatus for controlling a device loaded on a vehicle in which a control value therefor is on the basis of plural input signals, said control apparatus comprising:

basic control value memorizing means for memorizing a basic control value obtained for every combination of plural control zones preset for every signal value of said input signals;

adaptability memorizing means for memorizing a first adaptability of each control zone as a value in the range from 0 to 1.0, said control zone being set independently and individually for each input signal;

first adaptability determining means for determining a first adaptability for each of said input signals by referring a value of each of said input signals to said adaptability memorizing means;

second adaptability determining means for determining a second adaptability for each combination of said control zones by multiplying said first adaptabilities determined by said first adaptability determining means;

inference control value determining means for determining an inference control value for every combination by multiplying the basic control value and the second adaptability determined by said adaptability determining means; and final control value determining means for determining a final control value by dividing a value obtained by adding all inference control values for said combinations with a value obtained by adding all second adaptabilities.

9. In a control apparatus for controlling a device loaded on a vehicle in which a control value therefor is on the basis of plural input signals, said control apparatus comprising:

basic control value memorizing means for memorizing a basic control value obtained for every combination of plural control zones preset for every signal value of said input signals;

inference control value determining means for determining an inference control value on the basis of said basic control value and a second adaptability for every combination by first obtaining first adaptabilities for said respective control zones and then obtaining said second adaptability on the basis of said first adaptabilities from one combination of another; and final control value determining means for determining a final control value from said second adaptability and said inference control value.

10. A control apparatus as claimed in claim 1, wherein said control apparatus is an automatic drive apparatus for controlling an engine output by way of the feedback control so as to allow an actual vehicle speed to become a target vehicle speed; and said final control value determined by said final control value determining means is a control gain in the feedback control.

11. A control apparatus as claimed in claim 1, wherein said control apparatus is a slip control apparatus in which a torque transmitted to the driven wheel is adjusted so as to allow a magnitude of a slip of the driven wheel against a road surface to become a predetermined target slip ratio; and said final control value determined by said final control value determining means is said target slip ratio.

12. A control apparatus as claimed in claim 11, wherein said slip control apparatus adjusts the torque transmitted to the driven wheel at least by an output torque of an engine; and the final control value determined by said final control value determining means is a target slip ratio for said engine.

13. A control apparatus as claimed in claim 11, wherein said slip control apparatus adjusts the torque transmitted to the driven wheel at least by a braking force applied by the brake to the driven wheel; and the final control value determined by said final control value determining means is a target slip ratio for said brake.

14. A control apparatus as claimed in claim 11, wherein said slip control apparatus adjusts the torque transmitted to the driven wheel both by an output torque of an engine and by a braking force applied by the brake to the driven wheel.

15. A control apparatus as claimed in claim 14, wherein said basic control value memorizing means contains at least two kinds of memorizing means for an engine and a brake, and the final control value determined by said final control value determining means is two kinds, one for a target slip ratio for an engine and the other for a target slip ratio for a brake.

16. A control apparatus as claimed in claim 11, wherein said plural input signal contain a signal for a vehicle speed; and said target slip ratio gets smaller when the vehicle speed is larger compared to a smaller vehicle speed.

17. A control apparatus as claimed in claim 11, wherein said input signals contain signals for a vehicle speed, an acceleration of a vehicle body, and a steered angle of a steering wheel.

* * * * *